United States Patent [19]

Thompson et al.

[11] Patent Number: 4,843,295
[45] Date of Patent: Jun. 27, 1989

[54] METHOD AND APPARATUS FOR STARTING SINGLE PHASE MOTORS

[75] Inventors: Herbert A. Thompson, Cumberland, R.I.; Paul R. Tomlinson, Dallas, Tex.; Kevin J Dropps, Berkley, MA; Ronald A. Mancini, Leo, Ind.

[73] Assignee: Texas Instruments Incorporated, Dallas, Tex.

[21] Appl. No.: 57,996

[22] Filed: Jun. 4, 1987

[51] Int. Cl.$^4$ .............................................. A02P 1/44
[52] U.S. Cl. ........................................ 318/786; 318/779
[58] Field of Search ............... 318/778, 779, 785, 786, 318/729

[56] References Cited

U.S. PATENT DOCUMENTS

| | | | |
|---|---|---|---|
| 4,361,792 | 11/1982 | Davis et al. | 318/729 |
| 4,395,671 | 7/1983 | Sandler et al. | 318/786 |
| 4,581,568 | 4/1986 | Fitzpatrick | 318/729 |
| 4,628,241 | 12/1986 | Briston et al. | 318/729 |
| 4,653,285 | 3/1987 | Pohl | 361/22 |

Primary Examiner—David Smith, Jr.
Attorney, Agent, or Firm—John A. Haug; James P. McAndrews; Melvin Sharp

[57] ABSTRACT

A solid state starting system for electric motors having main and start windings of the capacitor start, capacitor start-capacitor run and split phase types uses a triac serially connected to the start winding. The system turns on the triac upon energization of the motor from an at rest condition and measures the locked rotor value of either the main winding current for any of the above motor types or start winding voltage for the capacitor start, capacitor start-capacitor run motor types. The system stores that valve as a calibration value and then measures subsequent values and turns off the triac when the subsequent values reach a selected proportion of the calibration value. The system re-energizes the triac upon further subsequent measured values reaching a selected cut in value relative to the calibration value which is indicative of an overload or stall condition. The calibration value is retained for a given period of time following a loss of power to provide desired starting characteristics.

26 Claims, 14 Drawing Sheets

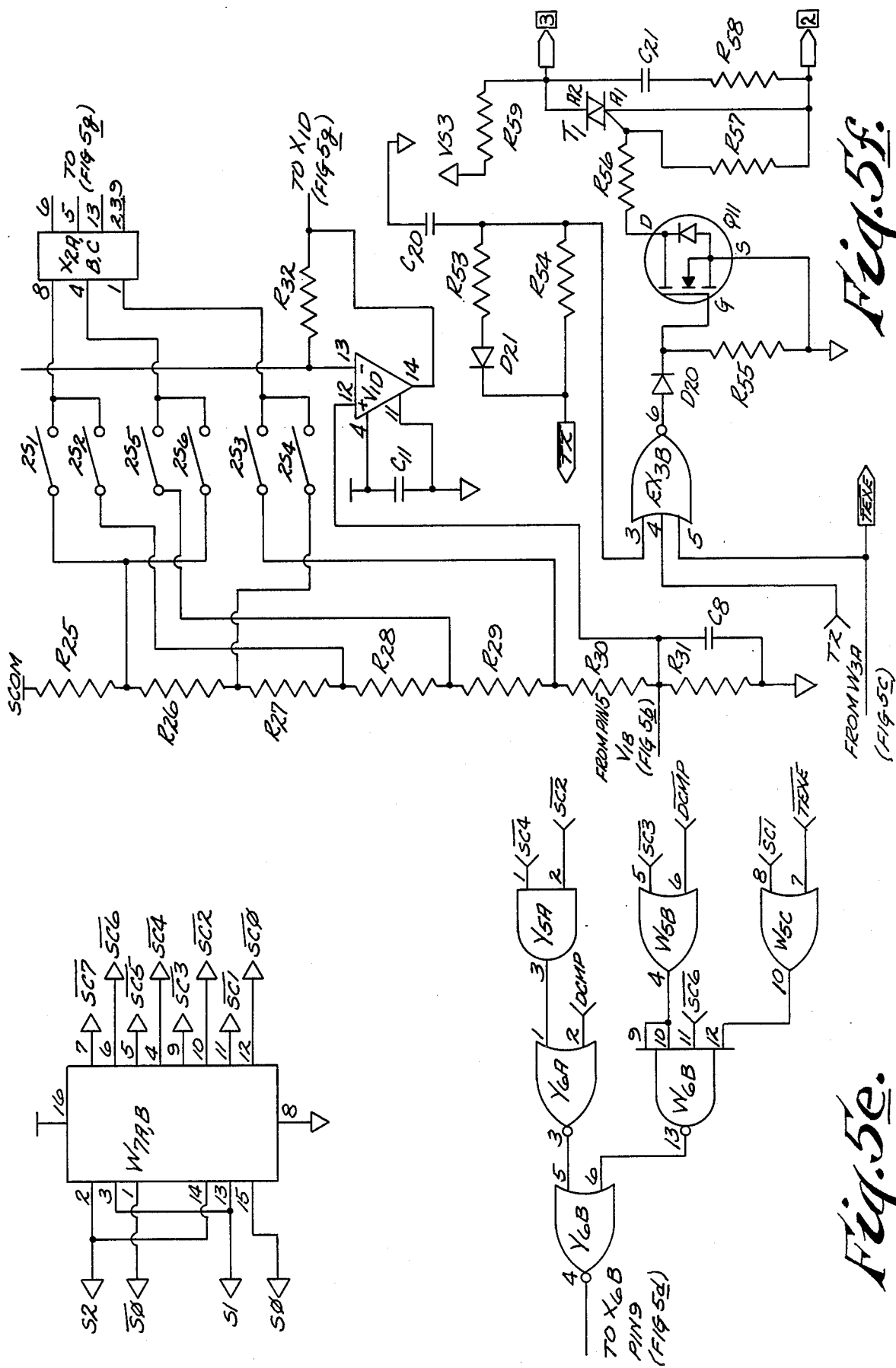

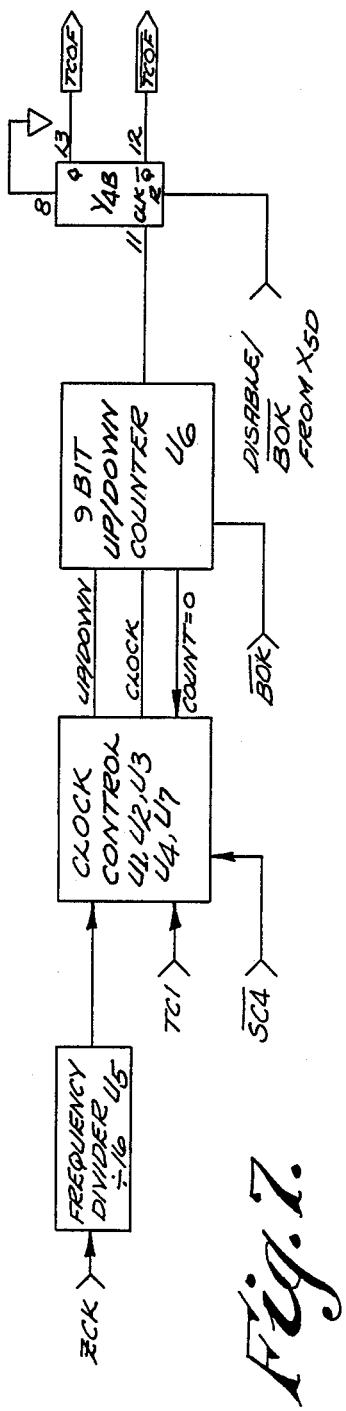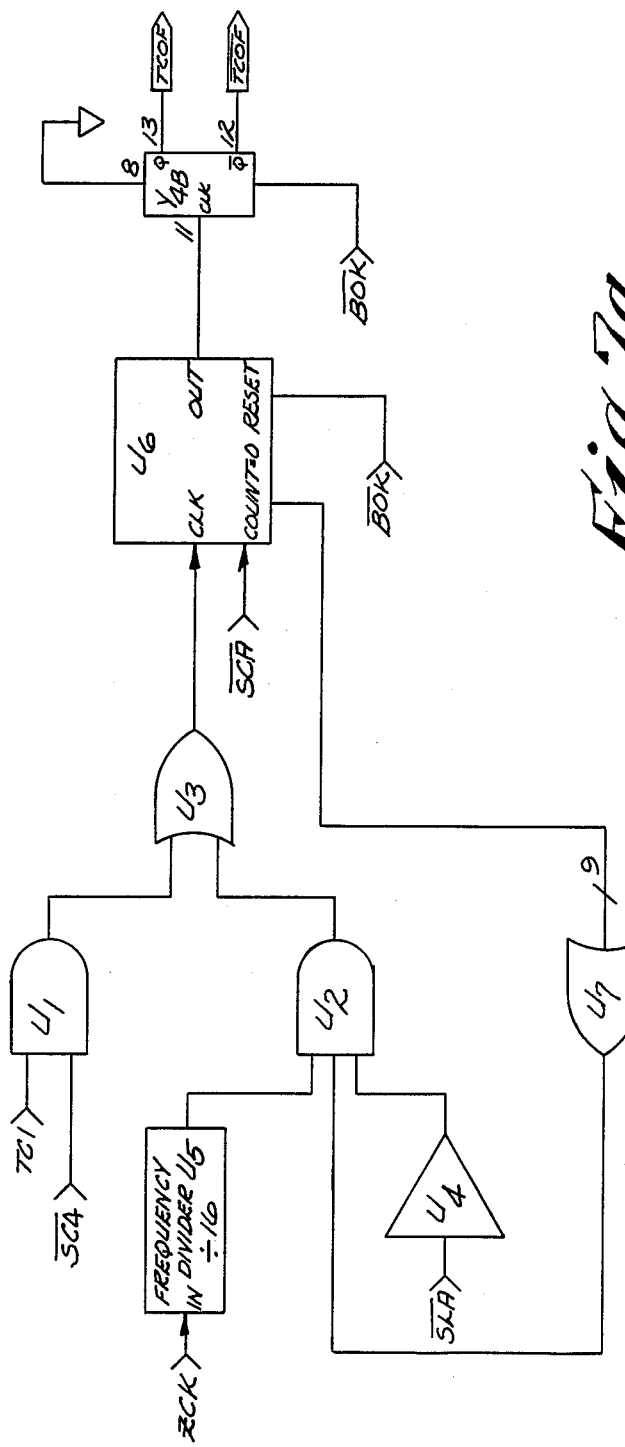
Fig. 7.
Fig. 7a.

METHOD AND APPARATUS FOR STARTING SINGLE PHASE MOTORS

BACKGROUND OF INVENTION

This invention relates generally to starting single phase motors and more particularly to starting capacitor start, capacitor start-capacitor run and split phase motors using solid state apparatus and techniques.

Such motors conventionally have been started using electromechanical relays or centrifugal switches. These devices are generally effective and are of relatively low cost but they suffer from certain inherent limitations. For example, since these devices have moving parts their longevity is limited thereby. Further, they are generally susceptible to being affected by dirt and chemical substances which may happen to be in their environment and they may also be sensitive to vibration. The most serious limitation however is the need to select and calibrate such devices for each motor rating.

It is an object of the present invention to provide a starting system and method for a single phase induction motor which can be used with a wide range or motor ratings, for example, from a tenth of horsepower up to approximately five horsepower.

Yet another object is the provision of a starting system and method which can be used with split phase motors as well as capacitor start and capacitor start-capacitor run motors.

Another object of the invention is the provision of a system which is reliable and long lasting.

Still another object of the invention is the provision of a starting system which will provide restart capability, prevent overloading of the start winding and be insensitive to line voltage variations.

Another object of the invention is the provision of a system that can readily replace existing systems, as a service part of as an original component, without significant modifications of the motor.

Various additional objects and advantages of the present invention will become readily apparent from the following detailed description and accompanying drawings.

SUMMARY OF THE INVENTION

Briefly, the above objects are realized by using a triac serially connected to the start winding of a single phase motor of any of a capacitor start, capacitor start-capacitor run or split phase type, and controlling the conduction of the triac and concomitantly energization of the start winding based on measuring ratiometric changes of either the start winding voltage or main winding current and comparing these changes to a value obtained during a calibration sequence.

According to a feature of the invention, a negative DC bias voltage is provided for the control module so that the triac can be driven in the second and third quadrants to minimize the required gate current. A powe supply detect circuit measures the value of the bias voltage and provides either a bias OK (BOK) signal indicative that the power supply is fully on or a system clear (SYSCLR) signal indicative that the bias voltage has decayed to a point where the data retained in the digital latches are considered not to be valid.

A triac enable (TENA) signal is issued by a state controller to a triac control circuit which turns on the triac and returns data to the controller when the actual command has been executed (TEXE). The triac control on the initial cycle always turns on the triac at a zero crossing of the triac voltage in order to protect the triac.

According to a feature of the invention an input signal processor is adapted to measure either start winding voltage or main winding current as selected and convert that into a DC level usable by comparators in the system. Every other half cycle is integrated and held for the following half cycle with decisions being processed during the following half cycle. The input signal processor is self timed to obviate phase relationship problems. The output of the input signal processor is a DC value proportional to the integration which, during a calibration sequence, is entered into a register as a calibration value with continuing measurements then compared to the calibration cut-in and cut-out constants that have been previously selected.

According to an alternative embodiment data measurements can be taken using multiple half cycles, for example two consecutive half cycles of the same polarity in order to improve the reliability of the data.

According to another feature of the invention, a start timeout counter is provided to prevent thermal overloading of the triac in the event that the motor fails to start after a selected period of time which, if desired, may be decremented during normal run time of the motor to avoid possible nuisance stalling of the motor.

According to a feature of the invention should the motor be overloaded during its normal run state, the start winding will be re-energized at a selected start winding voltage or main winding current value. If the power to the motor is interrupted the system enters a so called sleep state in which energy consuming portions of the system are turned off so that the calibration value can be retained for a selected period of time. If the motor is restarted within the selected period of time the recalibration sequence will be bypassed with the previous calibration value being employed.

BRIEF DESCRIPTION OF THE DRAWINGS

In the accompanying drawings in which several of the preferred embodiments of the invention are illustrated:

FIGS. 5a–5g together comprise a schematic circuit diagram of the control module of the instant invention selected to measure start winding voltage;

FIG. 6 shows a toroid for use in the control module when main winding current measurement is selected;

FIG. 7, a block diagram and FIG. 7a, a schematic circuit diagram, show a modification of the FIG. 5d portion of the system to provide decrement means for the triac time out counter.

DESCRIPTION OF THE PREFERRED EMBODIMENTS

Figure 1:
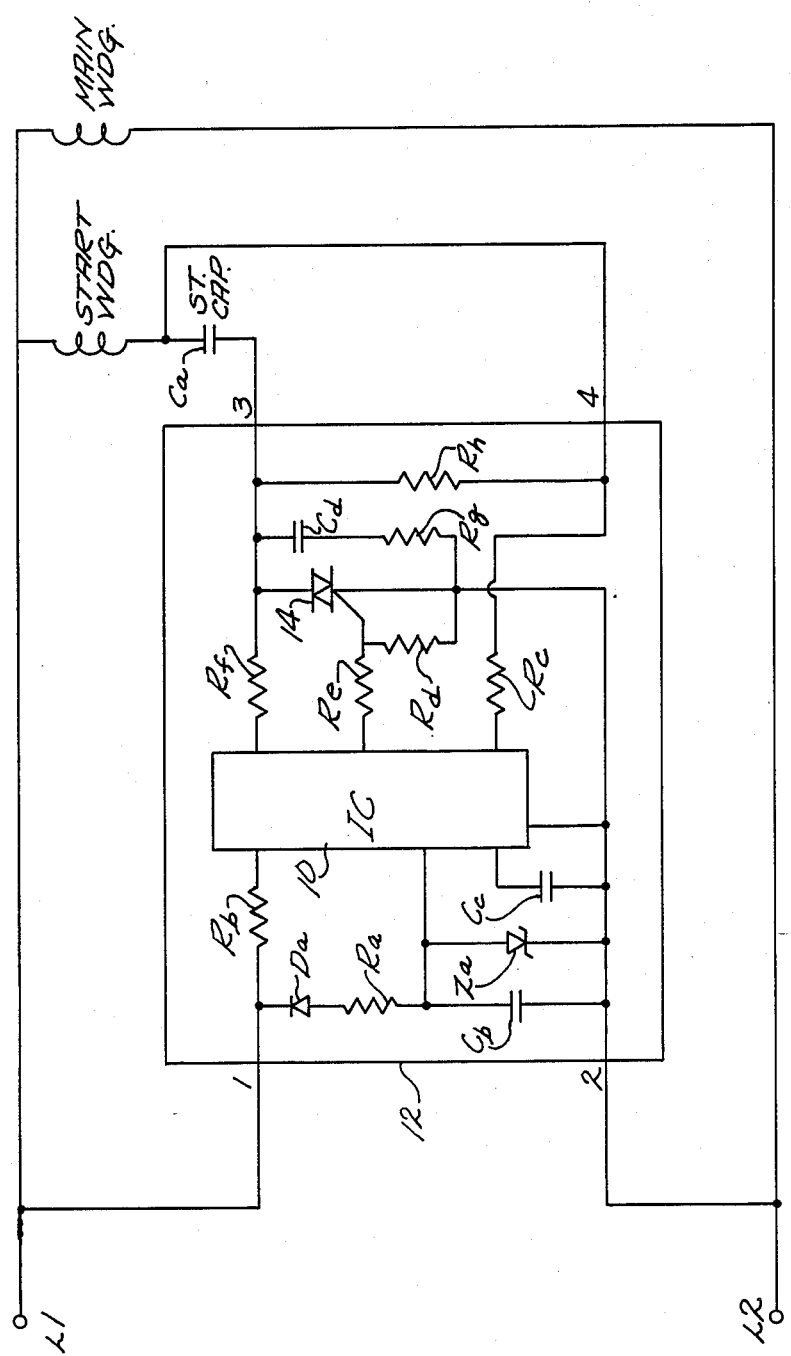
FIG. 1 is a schematic diagram showing the system used with a capacitor start motor.

Referring now to the drawings; FIG. 1 shows a control module made in accordance with the invention used to start a capacitor start motor. An integrated circuit 10 is mounted on board 12 which is provided with terminals 1 through 4. Terminals 3 and 4 are connected to opposite sides of a start capacitor $C_a$ which in turn is connected to the start winding of a capacitor start motor. Terminals 1 and 2 are connected respectively to power lines L1 and L2. The power supply for integrated circuit 10 comprises a filter capacitor $C_b$, dropping resistor $R_a$ and half wave rectifier diode $D_a$ serially connected between terminals 1 and 2. A zener diode $Z_a$ is connected on one side between the junctions of capacitor $C_b$ and resistor $R_a$ and IC 10 and on the other side to terminal 2. Zener diode $Z_a$ provides and regulates the supply to a selected level, e.g., 5 volts. An auxiliary power supply capacitor $C_c$ is shown connected between IC 10 and terminal 2 to provide power for the sleep feature to be explained below. Dropping resistor $R_b$ is connected between terminal 1 and IC 10 and dropping resistor $R_c$ is connected between terminal 4 and IC 10 to provide a suitable low voltage for the start winding voltage measurement.

Triac 14 is connected between terminals 3 and 2 with a gate control circuit comprising resistors $R_d$ and $R_e$ providing gating voltage for the triac. Zero voltage crossing to keep the voltage across the triac below approximately 20 volts to permit turn on the triac without deleterious effects is accomplished by sensing voltage across the triac through resistors $R_f$ and terminal 2.

Resistor $R_f$ connected between IC 10 and terminal 3 forms part of a zero voltage crossing turn on circuit also to be discussed below. An RC circuit comprising resistor $R_g$ and capacitor $C_d$ provides a snubbing function minimizing the rate of change of voltage over time to prevent triac misfiring. Resistor $R_h$, connected between terminals 3 and 4, is a bleeder resistor for the start capacitor of the motor to provide shorter restart times. It should be noted that resistors $R_b$ and $R_c$ used in measuring the start winding voltage do not need to be expensive low tolerance resistors since the measurement technique employed is ratiometric, as will be described in detail below, and therefore the cost of the circuit is considerably reduced compared to direct measurement techniques.

Figure 1A:
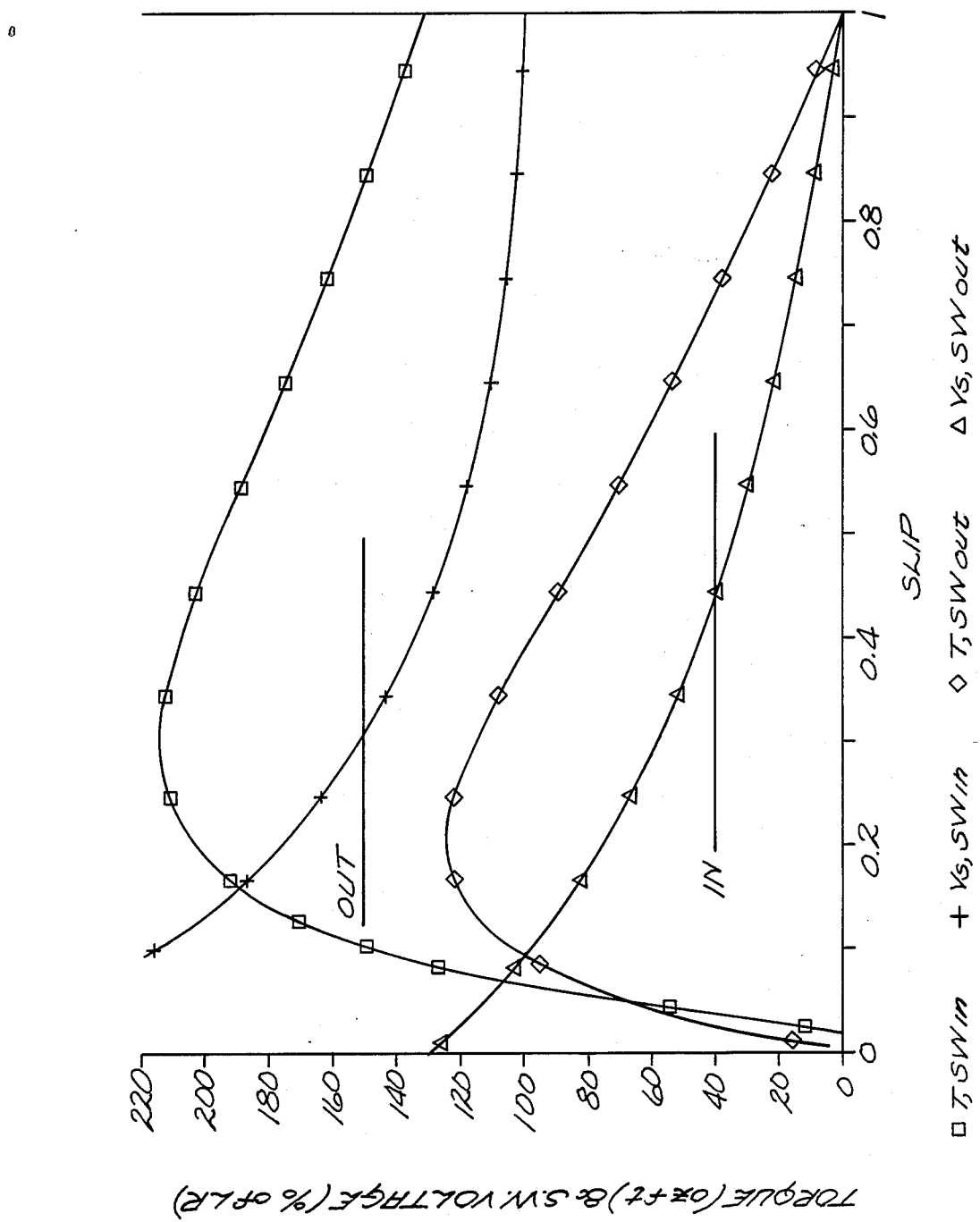
FIG. 1a is a graph showing torque and start winding voltage as a percent of locked rotor versus slip for a typical capacitor start motor.

FIG. 1a depicts motor characteristics of a capacitor start motor showing torque and start winding voltage with start winding both in and out of the current as a percent of locked rotor versus slip. The cut-in and cut-out values for the start winding are shown by the horizontal lines labeled In and Out at approximately 40% and 150% respectively. Upon initial starting of the motor the start winding is energized with the start winding voltage increasing along with torque, and at approximately 150% of locked value the start winding is de-energized with its voltage dropping to slightly under 60%. If an overload should occur the start winding voltage will decrease and upon reaching approximately 40% of the locked rotor value the system re-energizes the start winding to significantly increase the torque. The circuit provides a desired amount of hysteresis (differential between cut-out and cut-in values) to provide increased torque for such overloads.

Figure 2:
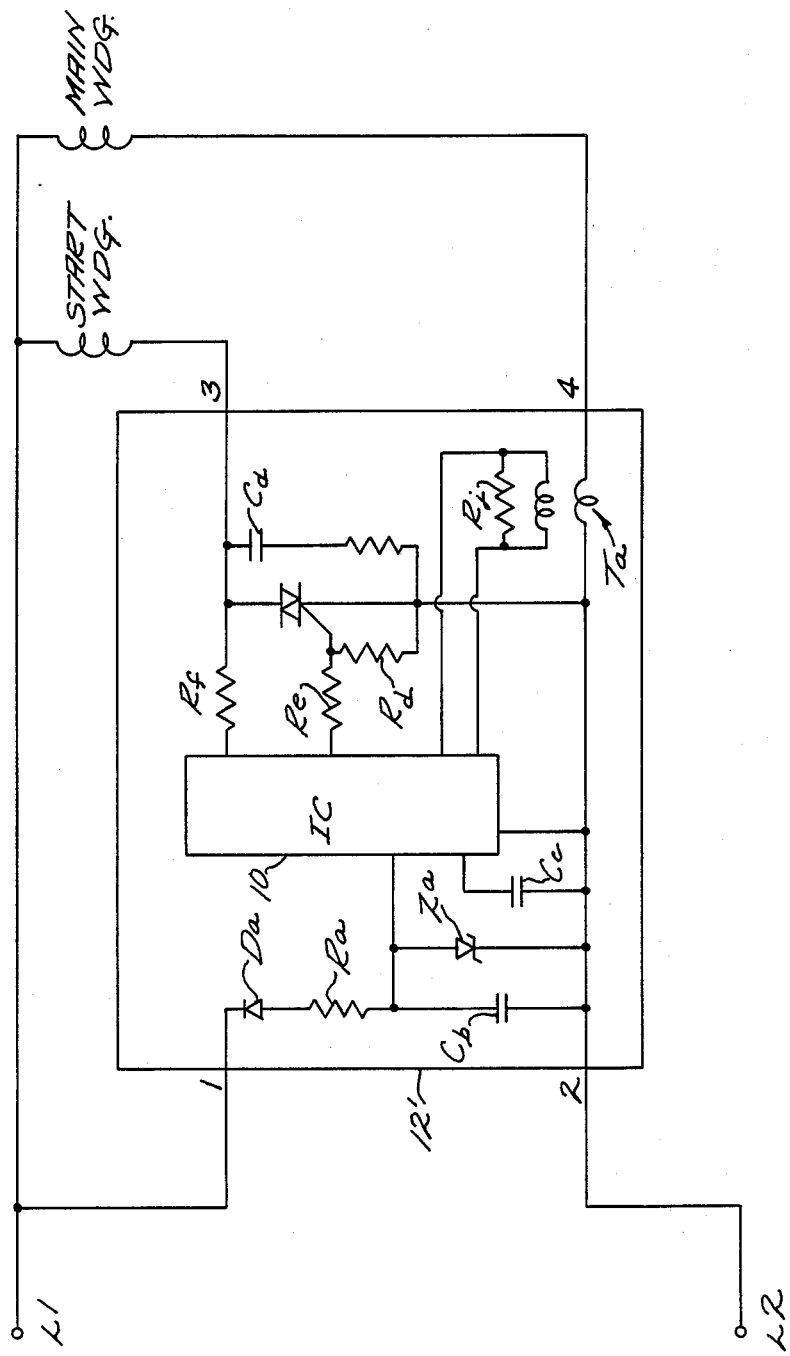
FIG. 2 is a schematic diagram showing the system used with a split phase motor.

FIG. 2 shows the system used with a split phase motor. IC 10 is provided with a current sensing toroid or current transformer $T_a$ with one or few turns connected between terminals 2 and 4 to carry main winding current and an output resistor R; coupled across the secondary winding connected to IC 10.

Figure 2A:
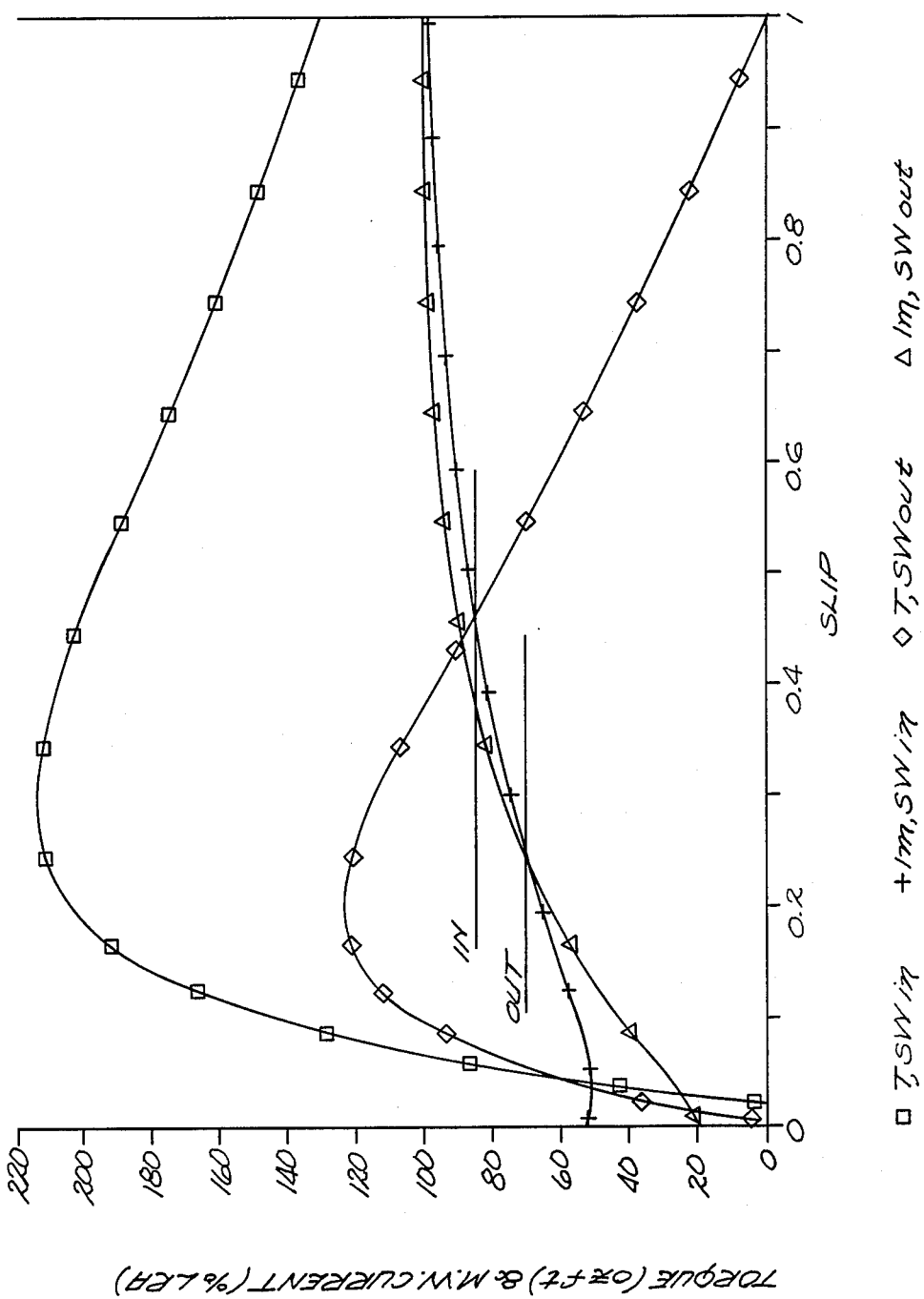
FIG. 2a is a graph showing torque and main winding current as a percent of locked rotor versus slip for a typical split phase motor.

FIG. 2a shows the motor characteristics of a single phase motor showing torque and main winding current as a percentage of locked rotor with the start winding energized and de-energized versus slip. The system de-energizes the start winding when the main winding current decreases to approximately 70% of the locked rotor value and re-energizes the start winding upon an overload which causes the main winding current to increase to approximately 85% of locked rotor value.

Figure 3:
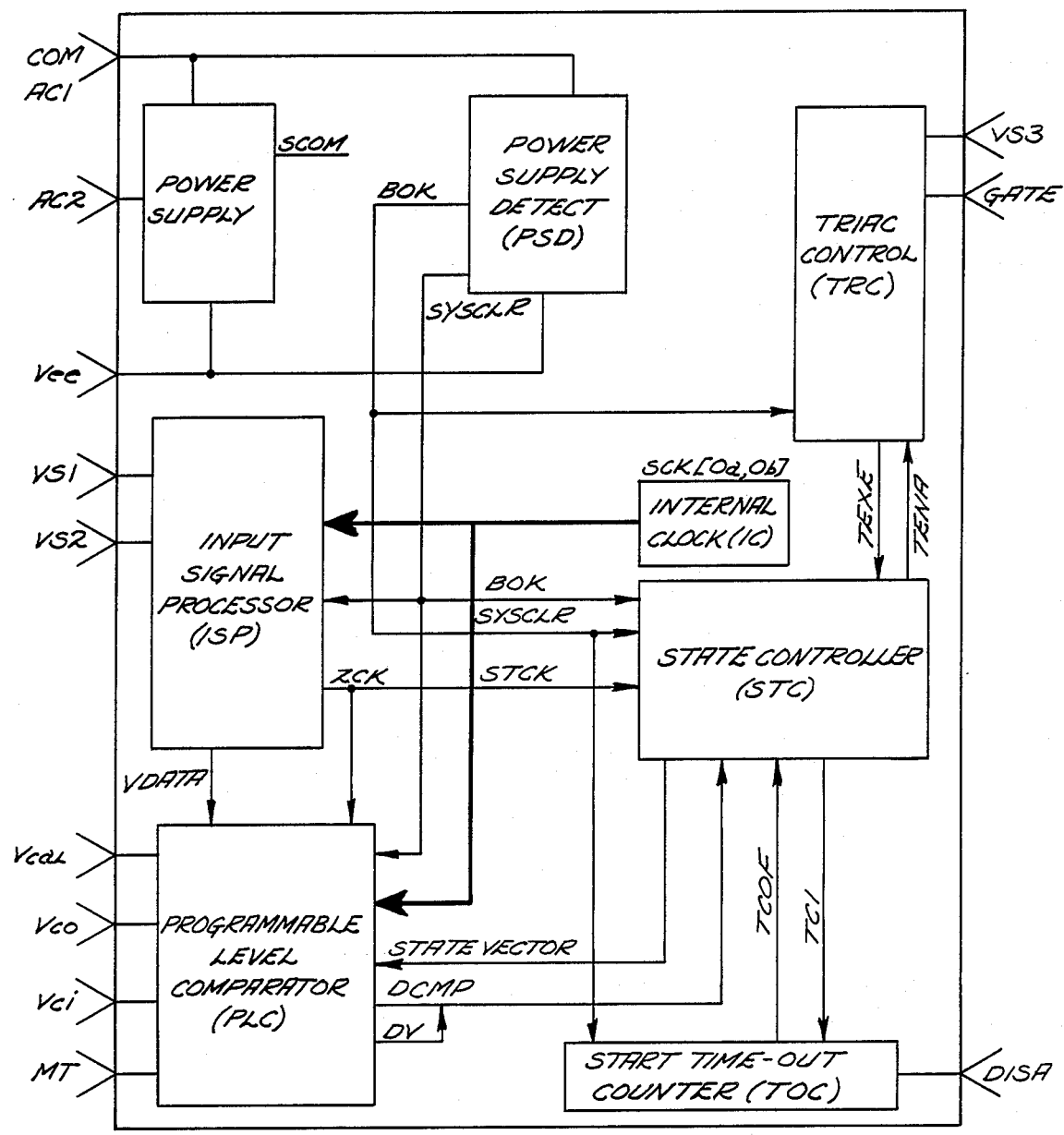
FIG. 3 is a block diagram of a control module used in the FIGS. 1, 2 system.

With reference to FIG. 3, the block diagram of the electronics (IC 10) includes a Power Supply, a Power Supply Detect (PSD), a Triac Control (TRC), a State Controller (STC), an Input Signal Processor (ISP), an Internal Clock (IC), a Programmable Level Comparator (PLC) and a Start Time-Out Counter (TOC). A system built in accordance with the invention comprises discrete components on a circuit board but is suitable for reducing to an integrated circuit. The IC package would have fourteen pins including; (1) COM, AC1-common for the power supply, (2) AC2-a power supply, (3) $V_{ee}$-a negative bias supply, (4) VS1-a positive sense analog input-voltage/current, (5) VS2-a negative sense analog input-voltage/current, (6) VS3-a triac sense analog voltage, (7) Gate-the triac trigger source, (8) $V_{Cal}$-a reference calibration voltage, (9) $V_{CO}$-triac cut-out voltage, (10) $V_{CI}$-triac cut-in voltage, (11) MT-select voltage or current operation (motor type), (12) DISA-disable triac-timeout counter and pins 13 and 14 not used.

The Power Supply converts 115 or 230 volts into a negative DC bias voltage used by the electronics in the system and the triac drive.

The Power Supply Detect circuit generates two logic control signals, a bias OF (BOK) indicative that the power supply is fully on, and a system clear (SYSCLR) indicative that the bias voltage has decayed to a point where the data retained in the digital latches is no longer considered to be valid.

The Triac Control circuit determines, under the control of the State Controller, when to trigger the triac that is driving the start winding. The Triac Control outputs either an enable signal that can be used by a zero crossing optical coupler or a direct triac drive based on second and third quadrant triac operation, as desired.

The Triac Control Circuit receives enable signals from the State Controller and returns data to the Controller when the actual command has been executed. The Triac Control insures when the triac is turned on the initial cycle always occurs at a zero crossing of the triac voltage to thereby prevent any large surge currents which can occur with capacitor start motors and avoid triac overloading.

The Input Signal Processor is adapted to measure either start winding voltage or main winding current and convert that into a DC level usable by the comparators in the system. The method used in determining the value involves integration of every other half cycle. Integration obviates spurious noise peaks which could otherwise affect the accuracy of the measurement. Every other half cycle is used to process the previous half cycle integration. The input signal processor is self timed by using the input voltage zero crossings to derive a clock signal called Z clock (ZCK) which is used to time the rest of the logic of the system. This results in avoiding phase problems regarding timing and signal processing. The output of the Input Signal Processor is a DC value proportional to the integration of the input data which is inputted to the Programmable Level Comparitor which compares the value to the calibration cut-in and cut-out constants which are ratiometrically programmed by the manufacturer of the system.

Since the system employs ratiometric comparisons the absolute value of any of the programming constants is not determinative but rather the division of one by another is determinative. This results in a system which is relatively independent of bias, voltage and temperature extremes.

The Internal Clock is a two phase high frequency clock used for switched capacitor circuits to insure that phase a and phase b have no overlapping edges.

The Start Time-Out Counter is a simple eight bit counter used to prevent the triac from thermal overload, that is, to turn off the triac if the motor cannot be started during a selected period of time.

sured. As soon as a power valid signal (BOK) is detected the motor start switch system will reset all programmable parameters in the electronics. As mentioned above the circuit is self timed with respect to the measurements that it is making on the input. If valid data transitions are detected on the input, the system will then proceed to initialize the triac. These states are coded as noted in FIG. 4 and TABLE 1.

In the normal sequence when the power is high enough to run the electronics all the registers will be initialized and the triac will be turned on. This allows time for the in-rush current of the motor to stabilize.

This is labeled state code 1 which has a binary equivalent to 001. The system outputs a triac enable system to the triac control and waits for the triac control to tell the state controller that the zero crossing of the triac voltage has been detected, and the triac in now being triggered on every half cycle of the 60 cycle input wave form. At this point the motor start winding voltage or main winding current can now be calibrated for the purpose of measuring ratiometric change. After the first zero crossing of the triac voltage, the system will enter state code 2 which has a binary equivalent of 010. In this

TABLE 1

| | SYN. CLOCKED BY ZCK | | | | | | | | | | DFF | | |
|---|---|---|---|---|---|---|---|---|---|---|---|---|---|
| | CURRENT ST | | | | INPUTS | | | OUTPUTS | | | VARIABLES | | |
| STATE NAME | CODE | S0 | S1 | S2 | TEXE | DCMP | BOK | TC1 | TENA | RST | NXS | D0 | D1 | D2 |
| RESET | 0 | 0 | 0 | 0 | X | X | X | 0 | 0 | 1 | 1 | 0 | 0 | 1 |
| INITIALIZE | 1 | 0 | 0 | 1 | 0 | X | X | 1 | 1 | 0 | 1 | 0 | 0 | 1 |
| INITIALIZE | 1 | 0 | 0 | 1 | 1 | X | X | 1 | 1 | 0 | 2 | 0 | 1 | 0 |
| CALIBRATE | 2 | 0 | 1 | 0 | X | 0 | X | 1 | 1 | 0 | 2 | 0 | 1 | 0 |
| CALIBRATE | 2 | 0 | 1 | 0 | X | 1 | X | 1 | 1 | 0 | 3 | 0 | 1 | 1 |
| RUN DETECT | 3 | 0 | 1 | 1 | X | 0 | X | 1 | 1 | 0 | 3 | 0 | 1 | 1 |
| RUN DETECT | 3 | 0 | 1 | 1 | X | 1 | X | 1 | 1 | 0 | 4 | 1 | 0 | 0 |
| RUNNING | 4 | 1 | 0 | 0 | X | 0 | X | 0 | 0 | 0 | 4 | 1 | 0 | 0 |
| RUNNING | 4 | 1 | 0 | 0 | X | 1 | X | 0 | 0 | 0 | 5 | 1 | 0 | 1 |
| LS RESTART | 5 | 1 | 0 | 1 | 0 | X | X | 0 | 1 | 0 | 5 | 1 | 0 | 1 |
| LS RESTART | 5 | 1 | 0 | 1 | 1 | X | X | 0 | 1 | 0 | 3 | 0 | 1 | 1 |
| ERROR | 6 | 1 | 1 | 0 | X | X | X | 0 | 0 | 0 | 6 | 1 | 1 | 0 |
| SLEEP | 7 | 1 | 1 | 1 | X | X | 0 | 0 | 0 | 0 | 7 | 1 | 1 | 1 |
| SLEEP | 7 | 1 | 1 | 1 | X | X | 1 | 0 | 0 | 0 | 3 | 0 | 1 | 1 |

| STATE NAME | OPERATIONAL SEQUENCE |
|---|---|
| RESET | THE NULL STATE, SYSTEM RESET |
| INITIALIZE | START TRIAC, WAIT FOR OK |
| INITIALIZE | RECEIVE OK FROM (TRC) |
| CALIBRATE | RUN CALIBRATION SEQUENCE, WAIT FOR RESULT |
| CALIBRATE | RECEIVED CALIBRATION COMPLETE |
| RUN DETECT | WAIT FOR CUT-OUT DETECT, INC (TOC) |
| RUN DETECT | CUT-OUT DETECTED |
| RUNNING | NORMAL RUN STATE |
| RUNNING | CUT-IN DETECTED, GO TO LS RESTART |
| LS RESTART | WAIT FOR TRIAC "ON" |
| LS RESTART | TRIAC "ON", GO BACK TO RUN DETECT |
| ERROR | TIME OUT ERROR STATE |
| SLEEP | POWER SUPPLY HOLD-UP |
| SLEEP | POWER BACK, RETURN TO FLOW |

| NAME/DEFINITION |
|---|
| BOK = T IF VEE IS VALID |
| TEXE = T IF TRIAC HAS BEN ENABLED |
| DCMP = T IF COMPARE RESULT |
| TCOF = T IF TOC HAS TIMED OUT |
| DV = SUCCESSFUL CALIBRATION DATA VALID LATCH |
| TCI = INDEX TOC |
| TENA = REQUEST TRIAC ON |
| RST = RESET SYSTEM |
| NXS = NEXT STATE CODE |

Figures 4, 5:
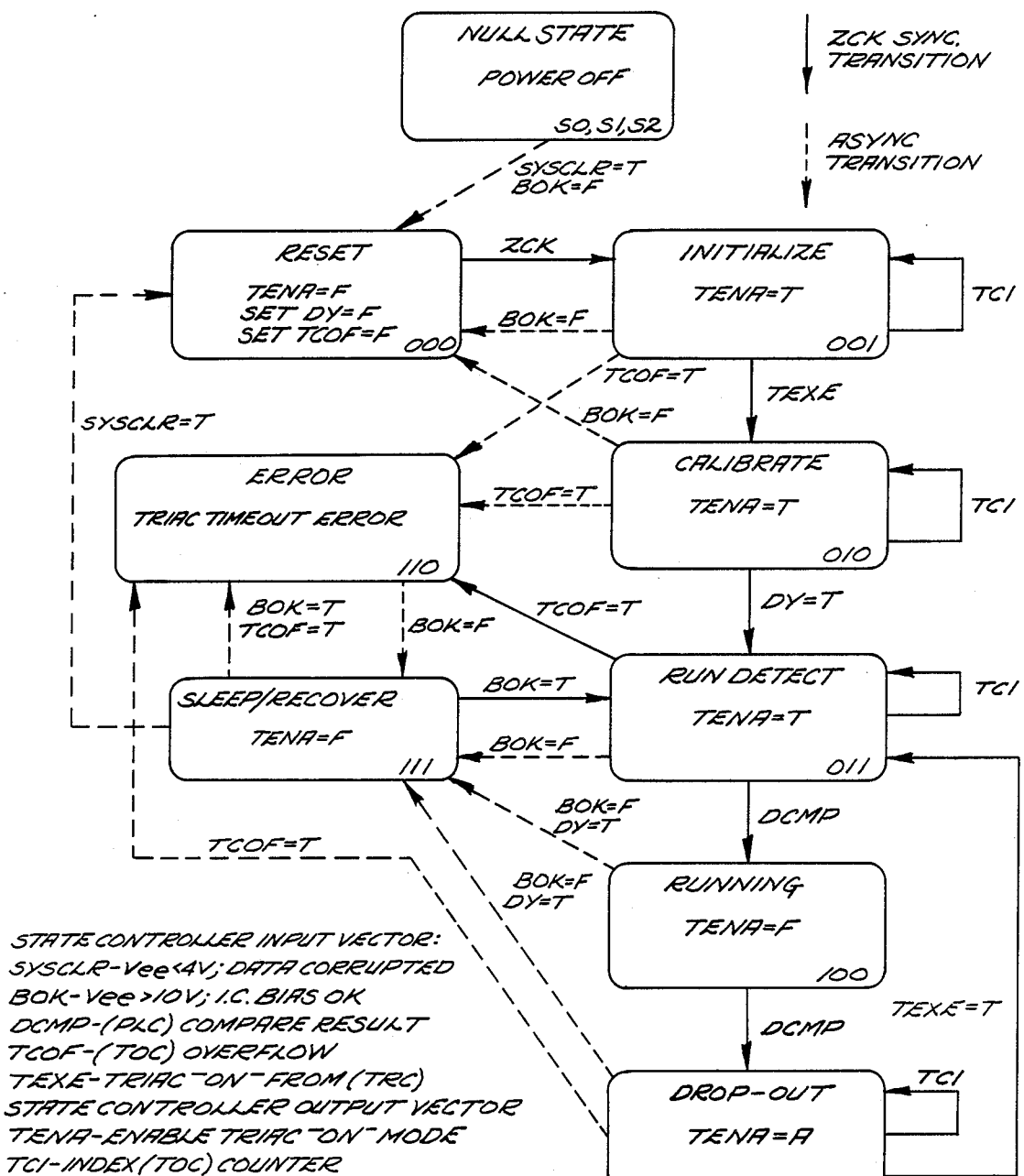
FIG. 4 is a state table showing the several states of operation and their sequence.
FIG. 5 shows the relationship of FIGS. 5a–5g to one another.

With reference to FIG. 4 and Table 1 the operational sequence will be described. In the Null State the power is off and the motor will be at rest. When the power switch is turned on the system must first obtain a DC bias necessary to run the electronics and then perform several operations based on the conditions that are measured.

state the triac is still on and the measurement system will now measure locked rotor start winding voltage or main winding current. The Input Signal Processor and Programmable Level Comparator are now directed by the State Controller to integrate, hold and detect a reference calibration level to be used in determining when the motor is at proper speed and when the motor needs to be restarted.

The method used requires that the calibration voltage in the electronics be normalized by a digitally controlled, data control circuit, to be discussed infra, which takes the calibration measurement and increases the gain of an amplifier until the output level of the amplifier equals the voltage that has been previously programmed as the calibration voltage labeled V-CAL. In this way, the total equivalent gain between the motor start winding voltage or main winding current is modified during the calibration cycle so that the gain constants can be used to determine ratiometric changes regarding cycles that occur later. When this gain is found, the system automatically loads the value of the gain into a register which can not be changed unless the circuit is completely reset. The data valid latch set to true tells the electronics that there is a valid locked rotor calibration of either start winding voltage or main winding current available to detect when the motor has started or when it has been stalled. When the data valid latch has been set, the system is ready to detect when the motor is actually run. This state is labeled run detect has a state code of 3 or a binary equivalent of 011.

In this state the triac is still energized while the system is detecting the start winding voltage or main winding current of every cycle then comparing that to the voltage used to determine when the triac should be cut-out.

As mentioned supra, the motor characteristic of capacitor start motors and split phase motors are different in that capacitor start motors have a start winding voltage that increases with increasing rotor RPM. In split phase motors, the start winding voltage does not change with speed. However, since main winding current decreases with increasing speed in both types of motors, split phase motors may use main winding current to sense speed changes. The MT input (motor type input) tells the programmable level comparator whether the system is to detect start winding voltage or main winding current. The run detect state simply waits until the start winding voltage has increased to the cut-out constant or main winding current has decreased to the cut-out constant. When this is detected it is represented by a signal from the Programmable Level Controller called the data compare (DCMP). When this occurs the controller knows that the start winding voltage has risen to a constant equal to the cut-out constant divided by the calibration constant, or in the main winding current mode that the cut-out constant divided by the calibration constant has been reached.

Once the system is running this state is labeled state code 4 which has a binary equivalent to 100.

The triac enable signal, labeled TENA, is now returned to zero and the triac controller disables the triac. The running state is the normal operating mode for the motor. From this state if a stall occurs, which means the motor is overloaded, the system is still detecting start winding voltage or main winding current. In the running state and if the so called cut-in constant is detected for either operating mode then the system will attempt an automatic restart similar to the initial start of the motor. This occurs when the State Controller receives the data compare signal from the programmable level Comparator. The transition between running and stall level or drop out state has a state code 5, a binary equivalent of 101.

The drop out state causes a triac enable signal to be sent to the triac controller, however, the triac controller will not attempt to turn on the triac until the voltage on the triac has been reduced to a selected value typically in the range of twenty to forty volts. This prevents the triac from turning on with relatively high DC voltage on its anodes and enhances the reliability of the system.

The State Controller receives confirmation from the Triac Control that the zero crossing has been detected and the triac is now being triggered. It will make the transition back to the run-detect state and the run-detect to run sequence is reinitiated. Should for any reason, however, the motor be permanently stalled, the function of the Start Time-Out Counter comes into play. This counter is intended to prevent thermal overloading of the triac. This is a simple eight bit counter that is cleared in the initialization state and indexed whenever the triac is enabled. In the state transition table these increments are labeled TCI and there is one increment for every transition or zero positive crossing of the measurement clock. This feature could be disabled at the discretion of the user. This describes the normal operating sequence of the motor start switch, however, there are several other conditions that can occur that the motor start switch system will properly handle. These include loss of power due to a momentary interruption of the power line or a triac timeout which occurs when the time counter overflows. This is represented in the state table as TCOF is true. Most of the transitions in the normal sequence are synchronized, that is, they trigger on the leading edge of the sixty (of fifty) cycle clock. However, other substates of the system are asynchronous since they can occur at any point in time. These asynchronous transitions are triggered when the triac time overflow counter has overflowed indicating that the triac should be turned off permanently or at least until the system is reset completely or by loss or bias, which occurs when the power has been interrupted to the system. These states are labeled error and sleep recover state, respectively. The error state code is 6 which has a binary equivalent of 110 and the sleep recover state is 7 with a binary equivalent of 111.

The error state can only be entered via the Start Time-Out Counter overflowing. This occurs when the triac has been on for a selected time, for example at least eight seconds which is at least seven or eight times, depending on the motor application, the amount of time required to start a motor. Once the time-out error state is entered the system will not re-energize the triac until the system is cleared. This requires that the bias voltage to the system diminish below the point at which any of the data can be successfully held by the latches and flip flops.

The sleep recover mode eliminates potential calibration errors during a brief loss of power. This state is entered when the bias is detected to be not valid and the system has a valid set of calibration data. If the system loses power before the motor has been successfully calibrated then no attempt to recover can be attempted and the system must be driven back to the reset stage. If the system does enter the sleep state then a motor restart without a calibration can be attempted. As soon as the bias is detected to be valid again, as long as the bias has not decayed to the value set as a system clear, the detection of a valid bias will cause the system to enter the run detect state, again, a normal start sequencing is re-enabled. The sleep-recover feature avoids the situation of using calibration data based on a motor which is still rotating due to a large moment of inertia, even though power has been interrupted.

Figure 5A:
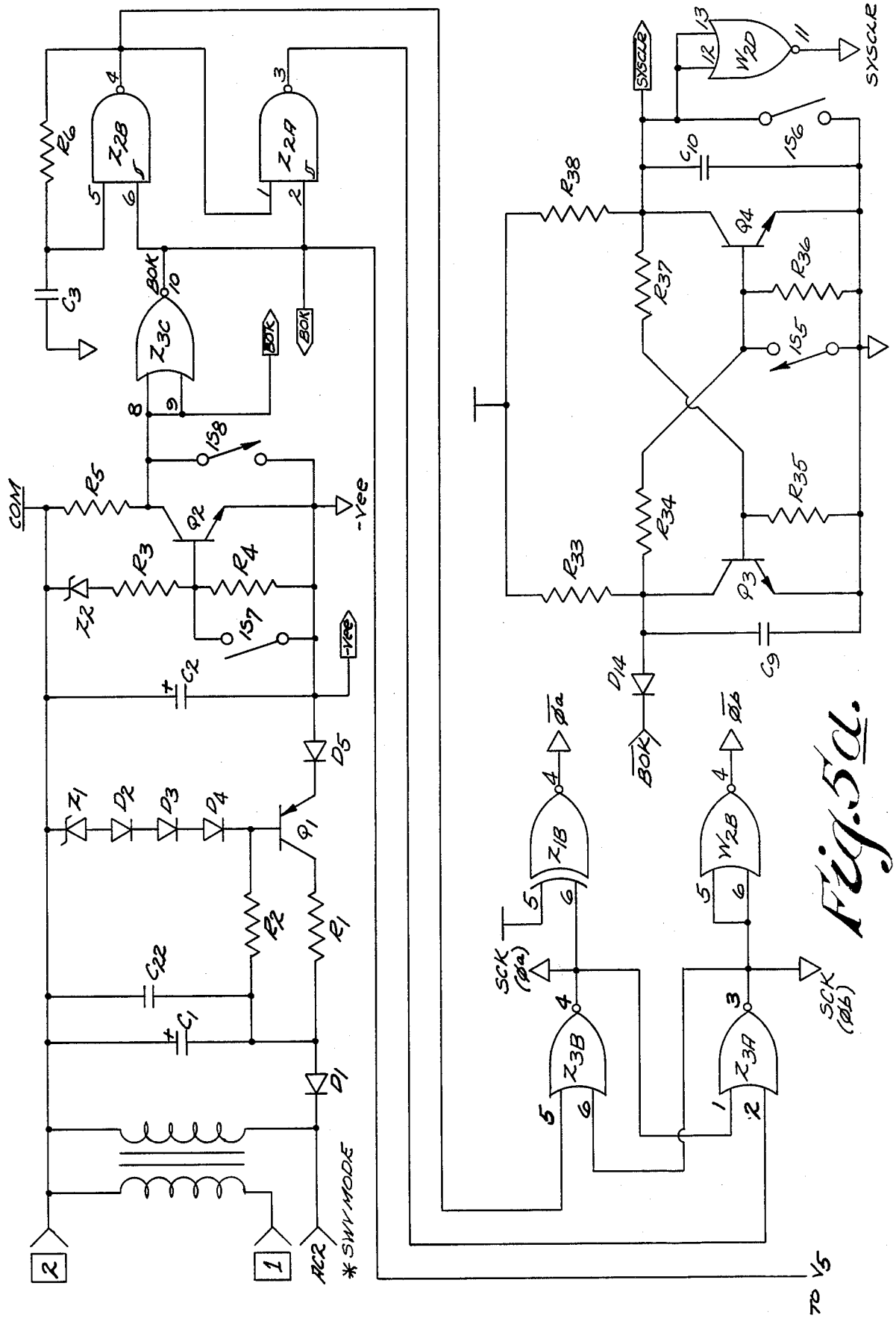

Referring now to FIG. 5a which shows an implementation employing discrete components, the Power Supply comprises a step down transformer shown at pins 1 and 2 needed due to the relatively large number of IC's employed. This would not be used when the system is reduced an IC. The line from pin 2 is the reference common for the entire electronics system and is connected to the power busing, a 60 (or 50) cycle AC wave form derived from the input power line. This is rectified by diode $D_1$ into a negative half cycle sine wave. Capacitor $C_1$ and $C_{22}$ filter that wve form into an RMS value plus the AC harmonics.

Transistor $Q_1$, and Diodes $D_4$, $D_3$, $D_2$, $Z_1$ coupled to the base of $Q_1$ form a voltage reference that defines the value of $-V$. Diode $D_5$ coupled to the emitter of $Q_1$ prevents flow of current from $-V_{ee}$ through $Q_1$ in its reverse direction. Resister $R_2$ biases $D_4$, $R_3$, $D_2$ & $Z_1$ and resistor $R_1$ limits the current through transitor $Q_1$ to protect $Q_1$. Capacitor $C_2$ is used to filter the output of the regulator and is the sleep function holdup capacitor.

The power supply detect circuit comprise two sections, the first generates a bias status logic signal—this logic signal is detected from the input bias signal $V_{ee}$. Zener diode $Z_2$, resistors, $R_3$ and $R_4$ are placed in series between common and $-V_{ee}$ with transistor $Q_2$ coupled between from $V_{ee}$ and the center tap of $R_3$ and $R_4$. Transistor $Q_2$, in collector is pulled up to common through resistor $R_5$. This forms a voltage switch which will send the collector voltage of $Q_2$ which is labeled $\overline{BOK}$ low whenever the voltage on Vee is greater than the zener voltage of $Z_2$ plus the base emitter voltage of $Q_2$ multiplied by the factor $1+R_3/R_4$.

It will be seen that the BOK signal can be programmed to different values by the selection of $Z_2$, and $R_3$ and $R_4$. The output of $Q_2$ is then inputted into a logic gate labeled $Z_{3C}$ which is a two input NOR gate connected as an inverter. This provides a logic true value for BOK. The system clear function is derived from transistors $Q_3$ & $W_4$ which form a resistively coupled latch that detects the relative value of $V_{ee}$. Collector pull ups for the latch are resistor $R_{33}$ and $R_{38}$. The feedbacks resistors are $R_{34}$, $R_{37}$, $R_{35}$ and $R_{36}$. Capacitor $C_{10}$ is used to decouple any RF interference from the latch. During normal operations with all the capacitors initially discharged as $V_{ee}$ begins to rise the output of the latch labeled $\overline{SYSCLR}$ would normally be low because of the different resistor ratios of $R_{34}$, $R_{36}$, $R_{37}$, $R_{35}$. This would clear all the latches. Once $V_{ee}$ is greater than approximately 4 volts, the voltage at which a flip flop will hold its data properly, the latch resets into the non clear mode. Thus if $V_{ee}$ is below the lower threshold all the data is cleared from the system but for any voltage above that threshold it is not. In the normal sequence, when power is lost, as $V_{ee}$ decays the BOK signal is used to eliminate all major power drain but the latches are not cleared unless $V_{ee}$ decays to the lower limit voltage.

Figure 5B:
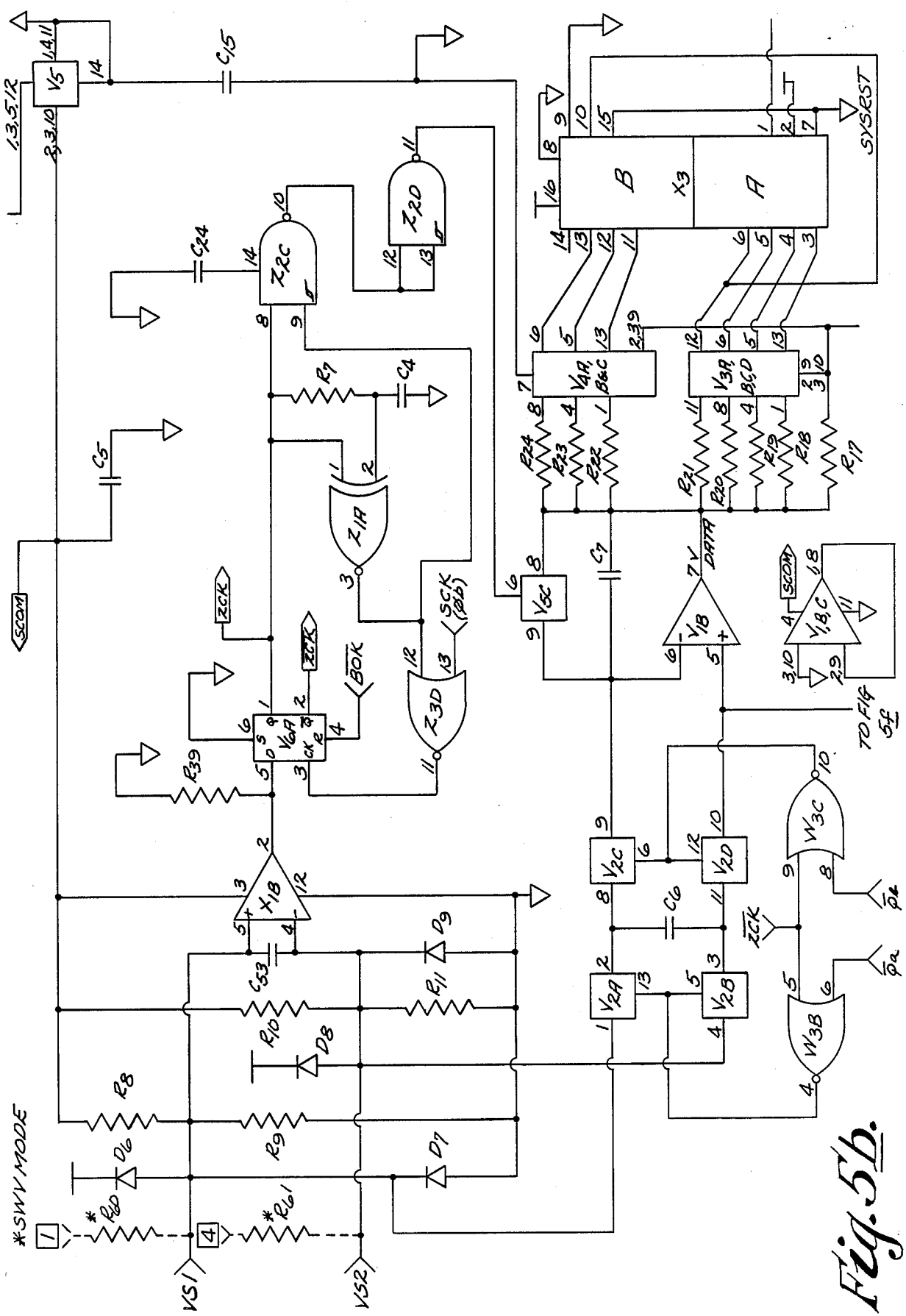
Figure 5C:
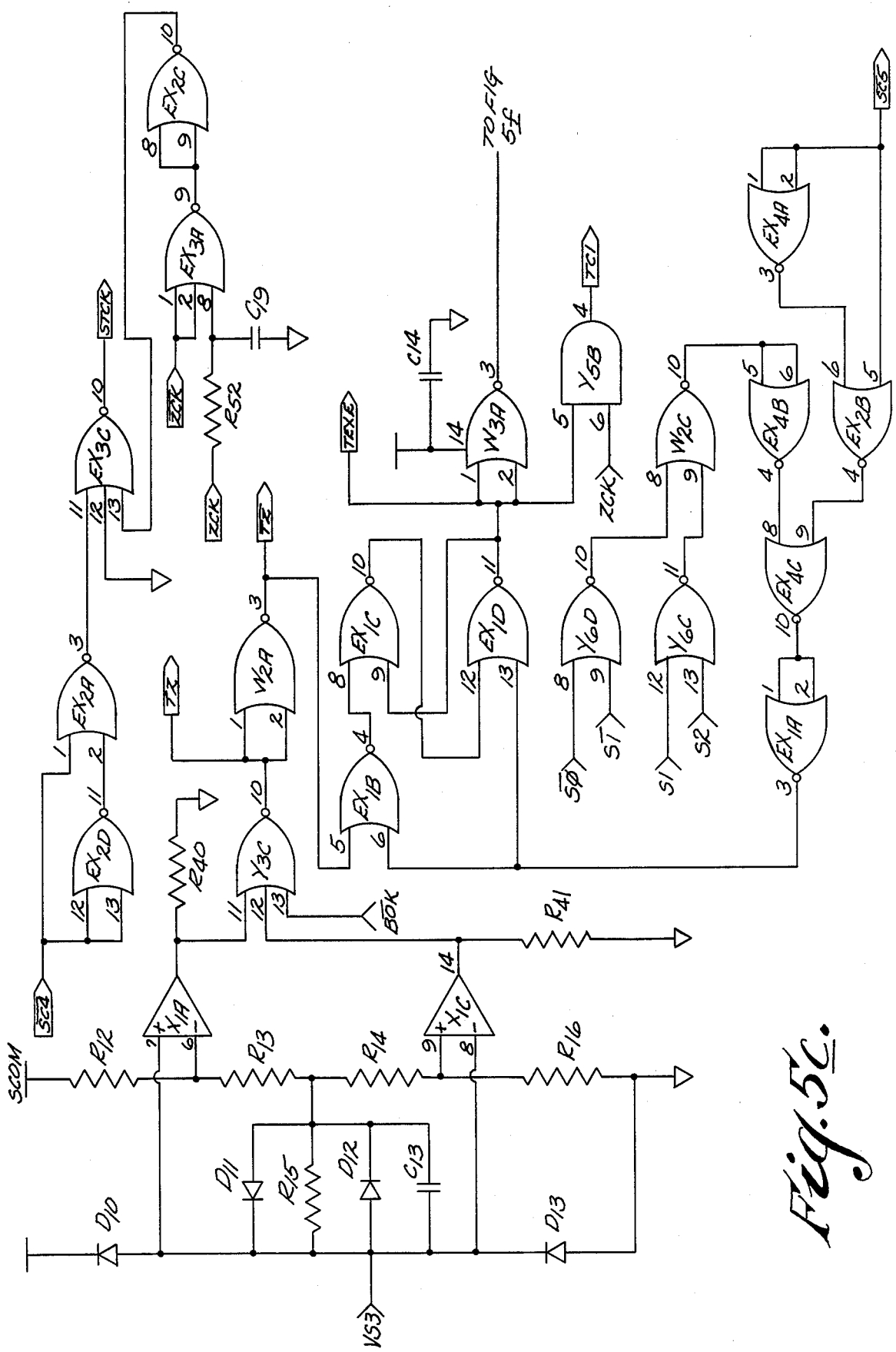

The triac control (see FIGS. 5c and 5f) senses the voltage across the triac and depending upon logic control from the State Controller determines proper triggering for the triac. As seen in FIG. 5c, the triac voltage is sensed through two comparators labeled $X_{1A}$ and $X_{1C}$. The resistor string formed by $R_{12}$, $R_{13}$, $R_{14}$ & $R_{16}$ and $R_{15}$ is used to set thresholds for when the triac voltage is above or below its zero value. Diode $D_{10}$, $D_{11}$, $D_{12}$ & $D_{13}$ are reverse protection diodes not required by the design but simulate the diodes present in an integrated circuit form of the circuit.

The two comparators' outputs are inputted to a three input NOR gate labeled $Y_{3C}$. The other input of the NOR gate is the BOK signal. The output of the 3 input NOR gate is inputted to a two input NOR gate labeled $W_{2A}$ which is the zero crossing signal. This logic signal will be low whenever the voltage on the triac is close to zero. This is the signal that determines the proper point to trigger the triac. Logic control for the triac control comes from the state control register into a set of combinational logic labeled $Y_6$. Two gates two input NOR gate sense the value of the State Control Register flip-flops and derive a logic signal called Triac Enable (TENA).

The TENA is inverted by a two input NOR gate fed into an RS latch labeled EX1. When the triac is enabled the RS latch is enabled on the next transition of the zero crossing signal from the comparators. One set, the latch, which has an output labeled TEXE, is set and is not reset until the triac is turned off by the State Controller. When the triac TEXE signal goes high, this means that the triac has been enabled by the State Controller and that a zero crossing has been detected and the triac may now be triggered on every half cycle. TEXE is inverted by two input NOR gate labeled $W_{3A}$ so that both the positive and negative logic versions are available.

The indexing for the Start Time-Out Counter (FIG. 5c) as mentioned are performed whenever the traic is enabled. This signal is labeled TCI and eminates from a two input AND gate $Y_{5B}$. The index signal is enabled by the triac execute and clocked by the zero clock that comes from the input signal processor.

The input signal processor (see FIG. 5b and 5c) comprises two sections. There is a section that generates the clock and a section that performs the measurement itself. The two inputs labeled VS1, VS2 have diodes $D_6$, $D_7$, $D_8$, $D_9$ which approximate the input protection diodes of an integrated circuit design version of the motor start switch. The inputs also have resistors $R_8$, $R_9$, $R_{10}$ and $R_{11}$ which establish a common mode voltage which is approximately equal to $\frac{1}{2} V_{ee}$. Since VS1 and VS2 are resistively coupled to the line voltage and the start winding voltage there will be an AC voltage appearing between VS1 and VS2 which is equal to the start winding voltage itself.

This differential signal is fed into a comparator labeled $X_{1B}$ and the output of that comparator, which is connected to ground through resistor $R_{39}$, is at logic 1 for VS1 greater than VS2 and at logic zero where VS2 is greater than VS1. This forms a clocking signal when the output of the comparator is high on positive half cycles and low on negative half cycles. The output of the comparator is then fed into a flip flop labeled $V_{6A}$ which is clocked by a combination of the internal clock and an edge triggered lock out circuit which simulates comparator hysteresis. The time out loop is formed by taking the output of the flip flop labeled zero clock or ZCK into an exclusive OR gate $Z_{1A}$ that has one input RC coupled by resister $R_7$ and capacitor $C_4$ to the other input. The output of $Z_{1A}$ is then a pulse on either a positive or negative transitions of ZCK. This signal is then fed into a two input NOR gate labeled $Z_{3D}$ which will lock out the clock of $V_{6A}$ for a time constant controlled by $R_7$ and $C_4$. Although not absolutely required by the design this is the time delay equivalent of hysteresis in a comparator. The output of $Z_{1A}$ is also fed into a two input NOR gate $Z_{2C}$. This output is then inverted again to derive a signal which is the integrator clear which will be discussed below.

The other section of the input signal processor is a differential switch compacitor integrator. The two phase internal clock is combined with the zero crossing clock so that during positive cycles of the zero clock the integrator is in the integrate mode. In the integrate mode (see FIG. 5a) phase A eminates from a two input NOR gate labeled $Z_{3B}$ and phase B comes from a two input NOR gate labeled $Z_{3A}$. These signals are then inverted. Phase A is inverted by a two input exclusive OR gate $Z_{1B}$. Phase B is inverted by a two input NOR gate $W_{2B}$. These signals are gated with the inverse zero clock signal by a two input NOR gate labeled $W_{3B}$ and $W_{3C}$ (FIG. 5b) to transfer gate labeled $V_{2A-D}$ and the input of the integrator-that is $V_2$ pins 1 and 4. During the phase A clock, while the zero clock is high, the voltage on VS1 and VS2 is sampled by capacitor $C_6$. During phase A the transfer gate labeled V2 pins 8 and 11 are off so the voltage on $C_6$ is equal to the voltage on VS1 minus VS2. This voltage then is a differential sample of the input voltage at the end of the phase A clock period. During phase B the input transfer gates are turned off and the output transfer gates $V_2$ pins 8 and 11 are turned on. These gates are connected to an operational amplifier labeled $V_{1B}$ with a capacitor $C_7$ connected between the output and the inverting input. During phase B clock capacitor $C_6$ is effectively switched over to the inputs of the operational amplifier. Current must flow between $C_6$ and $C_7$ since the differential input voltage of an operational amplifier must be zero and the voltage on capacitor $C_6$ previously contained the voltage of VS1. The amount of current that flows and the amount of voltage change that occurs on $C_7$ can be determined based on the distribution principle of switch capacitor circuits. The output of the operational amplifier labeled pin 7 is equal to the half cycle integration of VS1 minus VS2 while the zero clock is positive. When the zero clock goes negative the input transfer gates are disabled and the operational amplifier will hold the last value across $C_7$. It will hold this voltage for the entire negative half cycle of the zero clock, the hold interval. Since the system uses a single power supply there must be a virtual ground supplied to the system. This voltage is derived from the same string of resistors that set the calibration and set all the motor constants. As previously mentioned there is a clear signal supplied to the integrator, this clear signal is supplied on the leading edge of the zero clock which is the beginning of the integration period. This resets the integrator for a very short period during the very beginning of its integration cycle, giving it a known initial state.

The output of the input signal processor labeled V-data (FIG. 5b) is the output of the operational amplifier $V_{1B}$. The output of input signal processor, once again, assumes the form of the integration of VS1 minus VS2 during the positive cycle of the zero clock and is the last integration value obtained during the negative half cycle of the zero clock. That means that anytime during the negative zero clock period, the data measured from the motor start winding or main winding current can be processed and decisions made by the rest of the motor start switch system. The programmable logic comparator consists of two sections. The first section (FIG. 5b and 5g) is used during ythe calibration interval to determine the gain constants that normalize the calibration data. This system includes integrated circuits $X_3$ (A and B), $V_3$(A,B,C,D), $V_4$(A,B,C) two AND gates $Y_{5(C,D)}$ and the D flip-flop labeled $Y_{4A}$ which generates data valid. In the calibration state the counter labeled $X_3$ will have an initial value of zero. During the negative half cycle, the zero clock of V-data is equal to the last integration or in this case the integral of the calibration voltage. The gain of amplifier $V_{1B}$ is controlled by the counter $X_3$, the analog switches $V_3$ and $V_4$, and the values of resistors $R_{32}$ (FIG. 5f), $R_{17}$, $R_{18}$, $R_{19}$, $R_{20}$, $R_{21}$, $R_{22}$, $R_{23}$, and $R_{24}$. $R_{32}$ sets the maximum gain of the amplifier, the resistors $R_{18}$ to $R_{24}$ set binary weighted gain incremental values for amplifier $V_{1D}$. The data is amplified by $V_{1D}$ and compared to a value of the calibration data. This calibration data enters the system through programming of resistors $R_{25}$, $R_{26}$, $R_{27}$, $R_{28}$, $R_{29}$, $R_{30}$ and $R_{31}$. As noted supra either type of motor can be calibrated.

The general form of the calibration programming employs four resistors, the voltages across these resistors are switched into the comparators $X_{1D}$ inverting input by analog switch $X_2$. Depending on the state of the system, in particular during calibration state code 2 which is the calibration state the system switches the calibration voltage into the comparator so comparisons can be made between V-data amplified by a constant which is digitally controlled and compare it to a value previously programmed into the system by the user. So the gain of the amplifier is increased at a frequency determined by the internal clock, phase A and phase B. The length of time it takes to calibrate the system is determined by the relative magnitude of V-data and the relative frequency of the internal clock to the 60 cycle clock.

During the calibration interval the gain of the amplifier is incrementally increased until it's equal to the calibration voltage. At that point a combination of logic labeled $Y_2$, $Y_3$, $Z_{1C}$, $Z_{1D}$ tells the state controller that the calibration point has been found, the data valid latch $Y_{4A}$ is set and once the data valid latch is set, the counter is prevented from incrementing any further. Several events occur at once; the state controller is told that the calibration has been found and it has also been told that if the power is lost it can attempt to restart and the calibration circuit is locked out so that no further changes in gain in the calibration system are possible. The result is now that the input data relative magnitude times the gain of the calibration system has been normalized to a value equal to the calibration voltage programmed at the input pins. After calibration has been achieved, the programmable level comparator switches over to a simple comparator with a calibration gain constant. In the run detect state, as before, the data is integrated and held but the gain constant has been previously set. The cutout constant is switched into the comparator and the data is then compared to that at a constant gain equal to a calibration gain. This means that when the data is equal to the calibration voltage, a signal is sent to the state controller which indicates that value has been found and the motor has been successfully started. Further, should the motor be running while cut-in is being detected, the cut-in constant would be supplied to the comparator and then V-data would be compared to that constant to determine whether or not the triac should be turned back on. Since the D-compare signal or data comparison signal labeled DCMP must compare constants which have values greater than or less than the calibration value depending on the type of motor (mode of operation), there is a motor type logic signal supplied to the two input exclusive OR gates $Z_{1C}$ and $Z_{1D}$ that programs that motor type so that the data comparison signal is in the right state for both motor types.

The internal clock is derived from a Schmitt triggered two input NOR gate with time delayed feedbacks supplied by resistor $R_6$ and capacitor $C_3$. The clocking signal is gated with the bias OK signal so that the oscillator is turned off when the bias is not valid on the bus. As required by switch capacitor circuits, the phase A and phase B clocks must be non-overlapping ie, one clock signal must be all the way low before the other goes high since they are logical inverses of each other. This is accomplished by $Z_{3A,B}$ two input cross coupled NOR gates.

The sections of the control system which consume DC quiescent current are de-energized during the sleep period to avoid reduction in the memory hold-up time. The DC currents are removed by taking the bias OK signal and connecting that to an analog switch and switching off certain parts of the analog circuitry, including; The input zero clock in the input signal processor, the level shifting resistors in the input signal processor, the level shift sense resistors in the triac control register, the operational amplifier, the comparator and the calibration resistors.

Figure 5D:
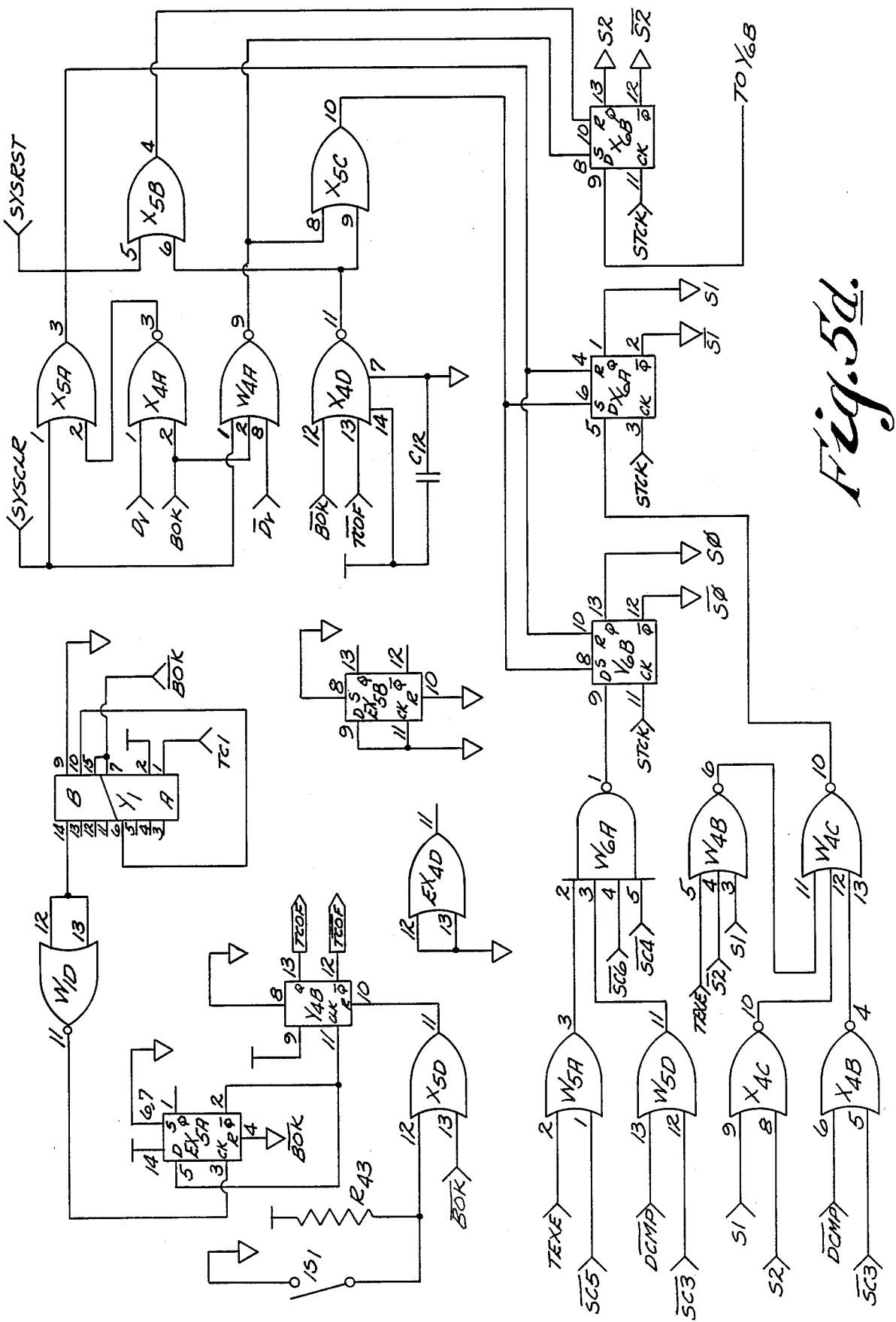

The start timeout counter (FIG. 5d) which is labeled Y is an eight bit counter of any type, $EX_{5A}$ and $Y_{4B}$ D type flip-flops, is cleared by $\overline{BOK}$ and indexed by the TCI signal from the triac controller. For every count that the triac is on the counter will index. If the counter overflows the latch or D flip-flop $Y_{4B}$ will be clocked by the inversion of the most significant bit of the counter which has been inverted one time by a two input NOR gate and set. Once the time counter overflow flip-flop as been set, it may not be reset except for a $\overline{BOK}$ signal or, if desired it may be manually disabled via shorting a pin or a switch to ground.

The state control counter (FIG. 5d) is a three bit state register formed by positive edge tripper D-flip-flops labeled $V_6$ and $X_6$. The outputs for this register are labeled $S_0$, $S_1$ and $S_2$ where the most significant bit is $S_0$ and the least significant bit is $S_2$. Using state table notation in the macro table previously discussed, the counters or the flip-flops are controlled both synchronously through their clocks and asynchronously through their set and reset lines by a combination of logic which makes decisions based on the current state of the register and the inputs. The states are decoded by a dual two to four decoder labeled $W_7$ (FIG. 5e). This integrated circuit takes the state outputs from the register and decodes them into state codes 0 thru 7, $\overline{SC0}$ thru $\overline{SC7}$. These decoded states are used by the logic to make the decisions on various states.

State 1 is initialize, state 2 is calibrate, state 3 is run detect, state 4 is running, state 5 is the low speed restart or dropout state, state 6 is an error state and state 7 is the sleep state. Inputs to the state controller includes the triac execute which means that the triac controller has executed the command sent to it by the state controller counter, the data compare signal which means that the desired result has been found by the programmable level comparator, and the bias OK signal. The outputs from the controller are the timeout counter index which means the triac is on the signal to enable the triac. In order to drive the state control counter in the proper states the data inputs of each flip-flop must be properly controlled as noted in Table 1.

Figures 5G, 6:
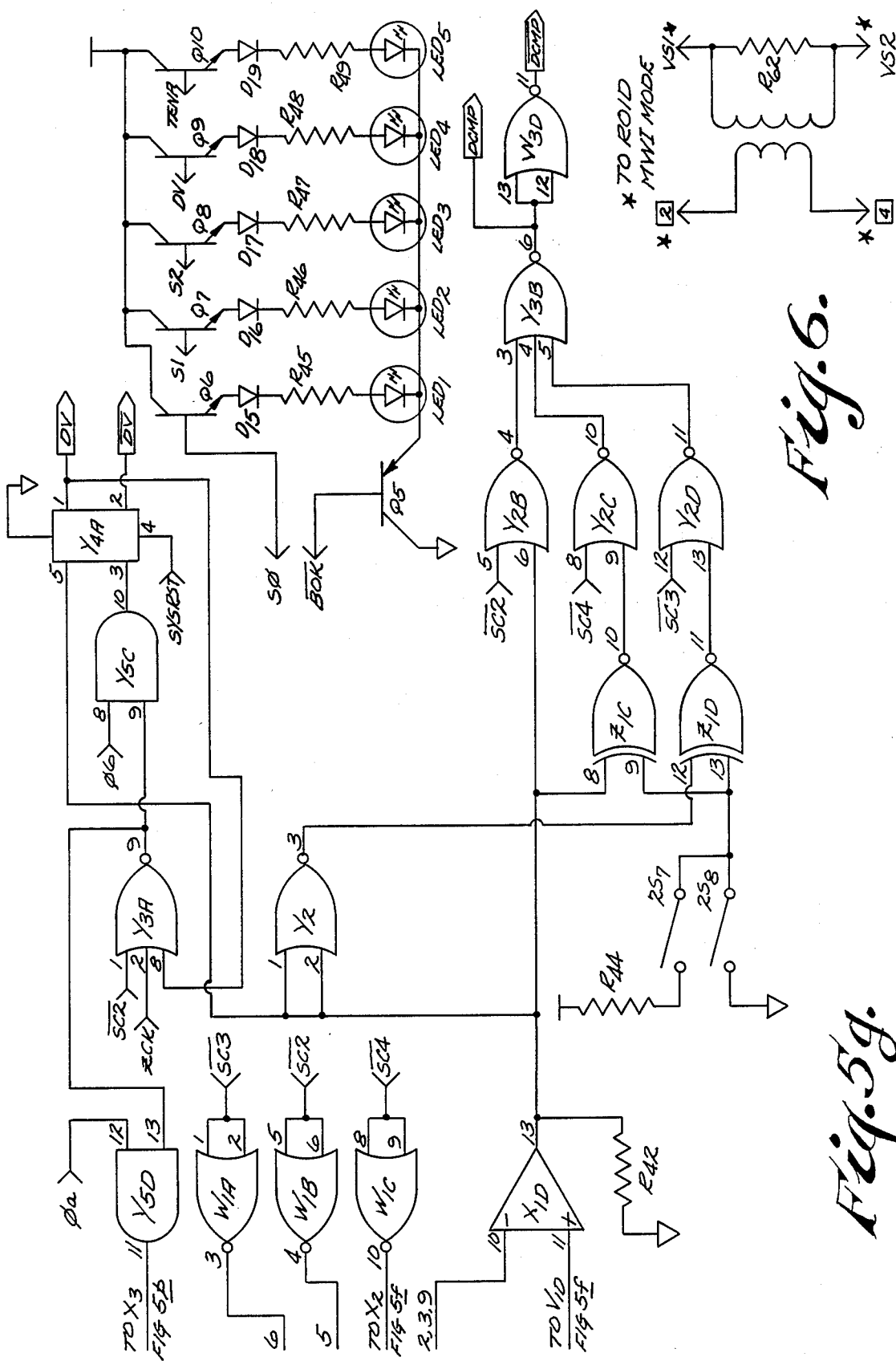

As seen in FIG. 5g means are shown to facilitate diagnostics including transistors $Q_5$, $Q_6$, $Q_7$, $Q_8$, $Q_9$ and $Q_{10}$ along with light emitting diodes $LED_1$, through $LED_5$ to provide visual indication of the state status of the system. While this feature is useful in prototype units it is not envisioned as being necessary in production systems.

As noted above, FIG. 5 shows the system used in a capacitor start configuration. In order to use the system in a split phase configuration a toriod current transformer is coupled across resistor $R_{62}$ (FIG. 6) and the appropriate logic inputted to the Programmable Level Comparator.

The following TABLE 2 lists components used in making a system in accordance with the invention.

TABLE 2

| PART DESIGNATION | PART # | DESCRIPTION |
| --- | --- | --- |
| EX1, EX2, EX4, W1 W2, W3, X4, Y2, Y6, Z3 | MC14001 | |
| W6 | MC14012 | |
| EX5, V6, X6, Y4 | MC14013 | |
| EX3, W4, Y3 | MC14025 | |
| V2, V3, V4, V5, X2 | MC14066 | |
| Z1 | MC14070 | IC's CMOS TYPE |
| W5, X5 | MC14071 | |
| Y5 | MC14081 | |
| Z2 | MC14093 | |
| X3, Y1 | MC14520 | |
| W7 | MC14556 | |
| V1 | TLC27L9 | |
| X1 | TLC3704 | |
| Q1, Q5 | 2N4403 | |
| Q2, Q3, Q4 | 2N3904 | BIOLAR TRANSISTORS |
| Q6, Q7, Q8, Q9, Q10 | 2N2222 | |
| Q11 | BS107 | MOSFET |
| Z1 | 1N4742 | ZENER DIODES |
| Z2 | 1N4739 | |
| TI | MAC224-8 | TRIAC |
| D1, D20 | 1N4004 | DIODE |
| D2, D3, D4, D5, D6, D7, D8, D9, D10, D11 D12, D13, D14, D15, D16, D17, D18, D19, | 1N914B | DIODE |

TABLE 2-continued

| | | | | |
|---|---|---|---|---|
| D21 | | | | |
| LED1-5 | | 46F4638 | LED | |
| S1, S2 | | BD08 | C & K 8 POS SPST DIP SWITCH | |
| TOROID | | TX1 | | |
| P.C. BOARD | | P1 | | |

| PART DESIGNATION | PART VALUE | TOL. | VOLTAGE RATIO | DESCRIPTION | |
|---|---|---|---|---|---|
| C1 | 100 uf | 10% | 50 VDC | ALUMINUM ELECTROLYTIC | \ |
| C2 | 330 uf | " | " | " | |
| C3 | 680 pf | " | " | CERAMIC | |
| C4 | .0047 uf | " | " | " | |
| C5 | 6.8 uf | " | " | ALUMINUM ELECTROLYTIC | |
| C6, C9, C10, C19, C20 | .001 uf | " | " | CERAMIC | CAPACITORS |
| C7 | .047 uf | " | " | CERAMIC | |
| C8, C11, C12, C14, C15, C24 | .1 uf | " | " | " | |
| C13, C53 | .01 uf | " | " | " | |
| C21 | .01 uf | " | 1000VDC | | |
| C22 | 47 uf | " | 50V | ALUMINUM ELECTROLYTIC | / |

| PART DESIGNATION | PART VALUE | WATTAGE | TOL. |
|---|---|---|---|
| R1 | 51 OHMS | θW | 5% |
| R2 | 2.2K OHMS | " | " |
| R3, R4 | 56K OHMS | " | " |
| R5, R8, R9, R10, R11 R12, R31 | 22.1K OHMS | " | 1% |
| R6 | 220K OHMS | " | 5% |
| R7, R52, R54 | 2.2 MEGOHMS | " | " |
| R13 | 1.3K OHMS | " | " |
| R14 | 1.0K OHMS | " | " |
| R15 | 68K OHMS | " | " |
| R16, R44 | 22K OHMS | " | " |
| R17, R18 | 680K OHMS | " | " |
| R19 | 330K OHMS | " | " |
| R20 | 150K OHMS | " | " |
| R21 | 82K OHMS | " | " |
| R22 | 39K OHMS | " | " |
| R23 | 20K OHMS | " | " |
| R24, R45, R46, R47, R48, R49, R53, R55 | 10K OHMS | " | " |
| R25 | 40.2K OHMS | " | 1% |
| R26 | 10K OHMS | " | 1% |
| R27 | 12.1K OHMS | " | 1% |
| R28 | 3320 OHMS | " | 1% |
| R29 | 27.4K OHMS | " | 1% |
| R30 | 20K OHMS | " | 1% |
| R32 | 62K OHMS | " | 5% |
| R33, R34, R35, R38 | 100K OHMS | " | " |
| R36 | 150K OHMS | " | " |
| R37 | 220K OHMS | " | " |
| R43 | 18 MEG OHMS | " | " |
| R57 | 1K OHMS | ½ | " |
| R58 | 100 OHMS | ½ | " |
| R39, R40, R41, R42 R60, R61 | 1 MEG OHMS | ¼ | " |
| R59 | 820K OHMS | " | " |
| R62 | 120 OHMS | " | " |

As described above, the system employs an accumulative triac maximum on time counter $Y_{1A,B}$ and $EX_{5A}$ to limit the triac junction temperature to a value below the triac junction maximum ratings. When 8.55 seconds (at 60 Hz) of triac time has accumulated the system goes into error state 6 thereby requiring removal of system power before the system can be reset to resume normal operation of the motor.

In some applications involving heavy motor loading, periodic energization of the start winding may be required to bring the motor and load back up to speed. In order to avoid having the system go into the error state should the selected time be accumulated during uninterrupted motor operation, FIGS. 7, 7a show a modification of the system, particularly the portion shown in FIG. 5d, to provide a resetting of the counter during normal operation. The FIG. 7, 7a modification decrements accumulated triac on time during state 4, the normal run operation, by down counting the triac maximum on time counter at a rate which still prevents overheating of the triac.

During normal triac on periods, states 1, 2, 3 and 5, the Signal $\overline{SC4}$ is high setting a nine bit up/down counter $U_6$ in an up count or increment mode and also enabling AND gate $U_1$ and disabling gate $U_2$. When the triac is to be energized the TEXE signal (triac execute) becomes high and signal TCI (triac counter increment) is generated at $Y_{5B}$ from TEXE and ZCK (FIG. 5c). Signal TCI is the fed through AND gate $U_1$ and OR gate $U_3$ to $U_6$ for clocking. Counter $U_6$ then accumulates TCI cycles as counts where one count or one TCI cycle represents 16.7 milliseconds of triac on time at sixty Hz or 20 milliseconds of triac on time at fifty Hz.

Counter $U_6$ will clock $Y_{4B}$ at TCI count 512 which represents 8.55 seconds at 60 Hz causing TCOF (triac counter full) to become true and cause the system to go into error state 6. If the triac is on for less than this time, less than 512 TCI counts will have been accumulated by counter $U_6$, so that $Y_{4B}$ will not be clocked, leaving TCOF false and permitting normal motor operation.

When the system goes into the run mode (state 4) signal $\overline{SC4}$ is low setting counter $U_6$ in a down count or decrement mode and also disabling gate $U_1$, and enabling gate $U_2$. In state 4 signal TCI is disabled so signal ZCK which generates TCI is fed to frequency divider U which divides its frequency by sixteen. The resultant lower clock signal $ZCK_{low\ frequency}$ is fed through gates $U_2$, $U_3$ to counter $U_6$ which decrements accumulated TCI counts at one sixteenth the rate they were accumulated. When and if counter $U_6$ reaches count=0 while being decremented the decrement disable OR gate $U_7$ will disable gate $U_2$ preventing $ZCK_{low\ frequency}$ from further decrementing of $U_6$. A $\overline{BOK}$ signal will also reset the counter to zero.

Figure 8:
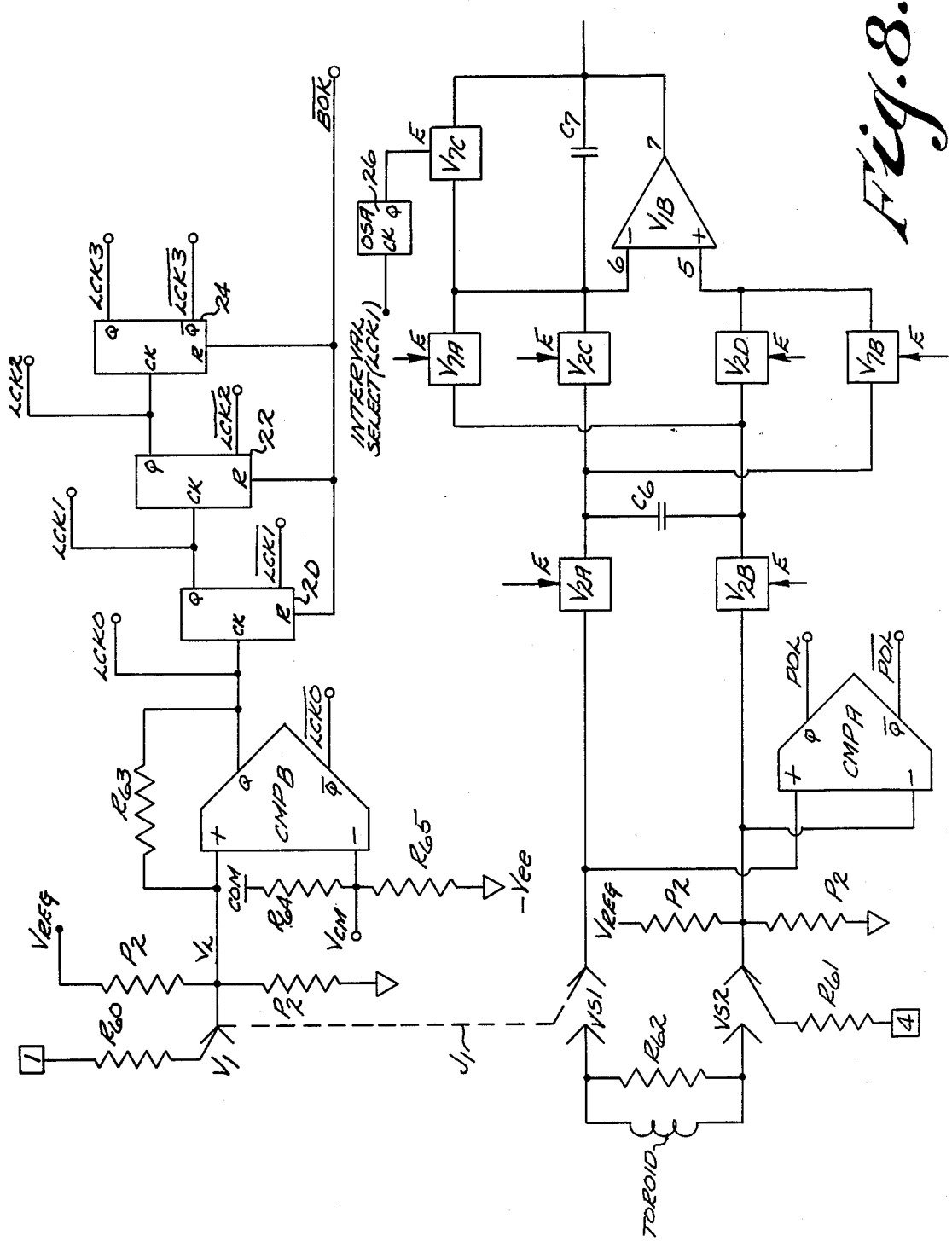
FIG. 8 is a schematic circuit diagram showing a modification of the measurement portion of the system.

FIG. 8 shows another modification in which the system is clocked with line voltage instead of Z clock. Common mode biasing for measurement of start winding voltage for capacitor start motors is provided by connecting V1 to VS1 through a jumper $J_1$. Common mode biasing for measurement of main winding current is provided by connecting the current transformer resistor $R_{62}$ between VS1 and VS2. Voltage at VL is level shifted by voltage divider $P_2$ and the result is inputted into the positive input of comparator CMPB and compared with the input common mode bias voltage $V_{CM}$ obtained through a voltage divider formed by resistors $R_{64}$ and $R_{65}$ connected between common and $-V_{33}$. Use of the resulting line clock ensures that when power is removed the system can not change states. A feedback resistor $R_{63}$ can be coupled between the positive input and the Q output in order to provide a minimum operating voltage to avoid brown out problems. The Q output of comparator CMPB is the line clock 0 (LCKO) and is used, inter alia, as a signal to effect a sampling measurement for a half cycle of the wave form and a hold for the other half cycle. Output Q from comparator CMPB is fed into the clock input of the first of a series of toggle flip flops 20, whose output Q is fed into the clock input of the second flip flop 22 of the series, whose output Q in turn is fed into a third flip flop 24 of the series. The toggle flip flops serve as frequency dividers to count down the line clock for various system operations. For example, the measurement period is set by selecting which line clock output is used to trigger an integration clear one shot 26. As shown in FIG. 8 line clock LCK1 is inputted into the CK input of one shot 26 to provide two cycles for the measurement period. That is, the integrator $V_{1B}$ integrates the measurement every other half cycle for each two cycles of the wave form. If it is desired to make the measurement period longer, then line clock LCK2 could be used to provide four cycles for the measurement period. As shown in FIG. 8, flip flops 20-24 are reset by $\overline{BOK}$ signal. The line clock output LCK1 et seq. can also be used to increment and decrement the triac time out counter.

Comparator CMPA is an input data comparator which senses the polarity of the VS1, VS2 signal and provides a polarity control POL, POL which is used to avoid phase errors by switching toggles $V_{7A,B}$, $V_{2C,D}$ to maintain the same polarity being inputted into integrator $V_{1B}$. This allows the measurement to start at any point of the input sine wave and still provide the desired integration. Integration is performed when line clock LCKO is true and is held when line clock LCKO is false. As described supra, during the hold period the integration data is processed by the other portions of the system.

Although the invention has been described with respect to specific, preferred embodiments thereof, many variations and modifications will become apparent to those skilled in the art. It is the intent that the appended claims be interpreted as broadly as possible, in view of the prior art to include all such variations and modifications.

What is claimed is:

1. A system for starting an electric motor having a main winding and a start winding comprising,
   a solid state switch having a gate and having first and second main terminals connectable in series with the start winding to control energization thereof,
   control apparatus comprising
   a power supply for providing a DC bias voltage,
   trigger means coupled to the gate for providing a signal to the gate to turn on the switch and energize the start winding, the trigger means turning on the switch upon energization of the motor from an at rest condition,
   measuring means to continuously measure a wave form of one of the main winding current and start winding voltage, the measuring means integrating the entire value of each half cycle of one polarity, the measuring means including an operational amplifier, a transfer gate having an output connected to an input of the operational amplifier, a first capacitor coupled to the transfer gate, means to take a plurality of differential samples of one half cycle of the wave form and apply the samples to the first capacitor, a second capacitor connected between an input of the operational amplifier and its output and means after each differential sample to turn on the gate connecting the first capacitor to the second capacitor to transfer the charge on the first capacitor to the second capacitor while the wave form is of one polarity so that at the end of the half cycle the output of the operational amplifier equals the integration of the entire half cycle,
   calibration means for storing a first integrated value as a calibration value, and
   comparison means for comparing the continuing integrated values to the calibration value, the trigger means interrupting the signal to the gate to turn off the switch and de-energize the start winding when the continuing integrated values reaches a threshold value which is a selected proportion of the calibration value.

2. A system according to claim 1 including means to derive the first integrated value by averaging the integrated values of at least two entire half cycles of the same polarity to minimize the effects of any spurious wave form.

3. A system for starting a single phase, capacitor start motor having a main winding and a start winding comprising,
   a triac having a gate and having first and second main terminals connectable in series with the start winding to control energization thereof,
   control apparatus comprising
   a power supply for providing a bias voltage,
   trigger means coupled to the gate for providing a signal to the gate to turn on the triac and energize the start winding, the trigger means turning on the triac upon energization of the motor from an at rest condition, measuring means to measure the start winding voltage integrating a plurality of samples of values of a given half cycle of the wave form, calibration means for storing a first value of start winding voltage as a calibration value, comparison means for comparing subsequent values of start winding voltage, the trigger means interrupting the signal to the gate to turn off the triac and de-energize the start winding when the subsequent start winding voltage values reach a threshold value which is a selected proportion of the calibration value.

4. A system according to claim 3 in which the calibration value is derived by averaging the values of at least two entire half cycles to minimize the effects of any spurious wave form.

5. A system according to claim 3 further including means for maintaining the calibration value for a selected period of time in the event that power to the motor is interrupted whereby upon resumption of power to the motor within the selected period of time the comparison means will compare the renewed subsequent values of start winding voltage to the calibration value existing before the power interruption.

6. A system according to claim 3 in which the threshold value of start winding voltage is approximately 150% of the calibration value of start winding voltage.

7. A system according to claim 3 in which the trigger means, subsequent to turning off the triac to de-energize the start winding, will provide a signal to the gate to turn on the triac and re-energize the start winding upon the decrease of start winding voltage to a selected re-energization value.

8. A system according to claim 7 in which the selected re-energization value is approximately 40% of the calibration value.

9. A system according to claim 3 further including means to disable the triac after a selected period of on time.

10. A system according to claim 9 in which the means to disable the triac includes a counter means and further including means to decrement the counter during normal running conditions of the motor.

11. A system according to claim 3 further including resistance means adapted to be coupled across the start capacitor of the motor to improve restart characteristics.

12. A system for starting one of a split phase, capacitor start and capacitor start, capacitor run motors having a main winding and a start winding comprising:

a triac having a gate and having first and second main terminals connected in series with the start winding to control energization thereof, control apparatus comprising a power supply for providing a bias voltage, trigger means coupled to the gate for providing a signal to the gate to turn on the triac and energize the start winding, the trigger means turning on the triac upon energization of the motor from an at rest condition, measuring means to measure the main winding current and integrate a plurality of samples of values of a given half cycle of the main winding current wave form, calibration means for storing a first integrated value of main winding current as a calibration value, comparison means for comparing subsequent values of main winding current, the trigger means interrupting the signal to the gate to turn off the triac and de-energize the start winding when the subsequent main winding current values reach a threshold value which is a selected proportion of the calibration value.

13. A system according to claim 12 in which the measuring means integrates a plurality of samples of values of a given half cycle for each half cycle of one polarity of the current wave form.

14. A system according to claim 13 in which the calibration value is derived by averaging the values of at least two half cycles to minimize the effects of any spurious wave form.

15. A system according to claim 13 including means for maintaining the calibration value for a selected period of time in the event that power to the motor is interrupted whereby upon resumption of power to the motor within the selected period of time the comparison means will compare the renewed subsequent values of main winding current to the calibration value existing before the power interruption.

16. A system according to claim 13 in which the threshold value of main winding current is approximately 70% of the calibration value.

17. A system according to claim 13 in which the trigger means, subsequent to turning off the triacs to de-energize the start winding, will provide a signal to the gate to turn on the triac and re-energize the start winding upon the increase of main winding current to a selected re-energization value.

18. A system according to claim 17 in which the selected re-energization value is approximately 85% of the calibration value.

19. A method for starting a single phase electric motor having a main winding and a start winding and a triac serially connected to the start winding comprising the steps of turning on the triac concomitantly with energizing the motor when starting from an at rest condition, measuring as a characteristic one of the locked rotor main winding current and start winding voltage and storing it as a calibration value, on a continuous basis measuring subsequent values of the same characteristic at least each half cycle of one polarity, comparing the subsequent values with the calibration value and turning off the triac when the subsequent values of the characteristic reach a selected proportion of the calibration value and maintaining the stored value of the calibration value for a selected period of time following an interruption of power to the motor sufficiently long to ensure that the motor has come to a complete stop.

20. A method according to claim 19 wherein the selected period of time is approximately twenty seconds or greater.

21. A method for starting a single phase electric motor having a main winding and a start winding and a triac serially connected to the start winding comprising the steps of turning on the triacs concomitantly with energizing the motor when starting from an at rest condition, measuring as a characteristic one of the locked rotor main winding current and start winding voltage, integrating an entire half cycle of a wave form converting converting the measurement into a low level voltage, inputting the low level measured value into an amplifier, increasing the gain of the amplifier until the output voltage equals a selected calibration voltage, loading the gain value into a register and comparing later low level measured values to determine when the triac should be disabled and enabled.

22. A method according to claim 21 in which the measurements are taken every other half cycle.

23. A method according to claim 22 in which a plurality of samples of a given half cycle is integrated to obtain a measurement value.

24. A method according to claim 23 in which the measurement used as a calibration value is derived from an average of at least two half cycles following an initial inrush cycle.

25. A method for starting a single phase electric motor having start and run winding and a triac serially connected to the start winding to control energization of the start winding comprising the steps of measuring one of the main winding current and start winding voltage as a motor performance characteristic, converting the measurement into a calibration voltage within a selected range, inputting the calibration voltage into one input of an amplifier, inputting a reference voltage into another input of the amplifier, increasing the gain of the amplifier until the output level of the amplifier equals the reference voltage, storing the resulting gain, taking later measurements of the same characteristic, resulting voltage into the one input of the amplifier using the same gain, inputting a selected cut out reference voltage into the said another input of the amplifier and de-energizing the start winding by turning off the triac when the resulting voltage equals the cut out reference voltage.

26. A method for starting a single phase electric motor having a main winding and a start winding and a triac serially connected to the start winding comprising the steps of turning on the triac concomitantly with energizing the motor when starting from an at rest condition, measuring as a characteristic the wave form of one of the locked rotor main winding current and start winding voltage by integrating the entire value of a given half cycle of the wave form, storing the value to provide a calibration value, continuing to measure the wave form by integrating the entire value of following half cycles of one polarity and comparing the resulting value with the calibration value and de-energizing the start winding when the measured value reaches a selected value relative to the calibration value.

* * * * *